United States Patent
Ehrlich

(10) Patent No.: US 9,296,280 B2
(45) Date of Patent: Mar. 29, 2016

(54) HINGED BOTTOM ROLLER ASSEMBLY AND COUNTERBALANCE MECHANISM FOR OVERHEAD DOOR

(75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 731 days.

(21) Appl. No.: 13/301,471

(22) Filed: Nov. 21, 2011

(65) Prior Publication Data

US 2012/0125545 A1     May 24, 2012

Related U.S. Application Data

(60) Provisional application No. 61/416,107, filed on Nov. 22, 2010.

(51) Int. Cl.
*E05D 15/00*     (2006.01)
*B60J 5/14*     (2006.01)

(52) U.S. Cl.
CPC .......................................... *B60J 5/14* (2013.01)

(58) Field of Classification Search
CPC ............ E05D 13/1215; E05D 13/1238; E05D 13/1284; E05D 13/145; E06D 13/1261; E06B 9/58
USPC ........... 160/201, 229.1; 16/366, 365, 97, 102, 16/103, 107, 87 R–87 B
See application file for complete search history.

(56) References Cited

U.S. PATENT DOCUMENTS

| | | | |
|---|---|---|---|
| 1,857,756 A * | 5/1932 | Headley | E05D 15/165 134/167 R |
| 1,985,976 A * | 1/1935 | Clark | 160/209 |
| 2,059,585 A * | 11/1936 | Kelly | 160/209 |
| 2,703,141 A * | 3/1955 | McKee | 160/209 |
| 4,115,900 A * | 9/1978 | Mihalcheon | 16/104 |
| 4,640,049 A | 2/1987 | Duncan | |
| 4,882,806 A | 11/1989 | Davis | |
| 4,949,772 A * | 8/1990 | Ballyns et al. | 160/201 |
| 5,235,724 A | 8/1993 | Perrin et al. | |
| 5,239,777 A | 8/1993 | Husselton | |
| 5,419,010 A | 5/1995 | Mullet | |

(Continued)

OTHER PUBLICATIONS

Patent Cooperation Treaty—Notification of Transmittal of the International Search Report and the Written Opinion of the International Searching Authority, or the Declaration for PCT International Application No. PCT/US11/61711. Date of Mailing Apr. 10, 2012, 17 pages.

(Continued)

*Primary Examiner* — Blair M Johnson
*Assistant Examiner* — Jeremy Ramsey
(74) *Attorney, Agent, or Firm* — Carli E. Stewart

(57) ABSTRACT

An overhead door assembly configured to be coupled to a storage container, such as a truck trailer, including an overhead door including a plurality of door panels hingedly coupled to one another and a bottom roller assembly coupled to a bottom panel of the door. The bottom roller assembly includes a hinge and a roller coupled to a lower hinge plate of the hinge. The roller includes a shaft and a roller wheel coupled to one end of the shaft. Illustratively, the lower hinge plate and the roller thereon are configured to pivot about a pivot axis of the hinge relative to the bottom panel of the door between a first position generally adjacent the bottom panel of the door and a second position spaced-apart from the bottom panel of the door.

19 Claims, 17 Drawing Sheets

(56) References Cited

U.S. PATENT DOCUMENTS

| | | |
|---|---|---|
| 5,632,063 A | 5/1997 | Carper et al. |
| 5,636,678 A | 6/1997 | Carper et al. |
| 5,768,828 A | 6/1998 | Wilson |
| 5,865,235 A | 2/1999 | Krupke et al. |
| 5,918,660 A | 7/1999 | Crawford et al. |
| 5,921,307 A | 7/1999 | Ford et al. |
| 5,964,268 A | 10/1999 | Carper et al. |
| 6,076,590 A | 6/2000 | Ford et al. |
| 6,081,966 A | 7/2000 | Antekeier et al. |
| 6,112,799 A | 9/2000 | Mullet et al. |
| 6,125,582 A | 10/2000 | Mondragon et al. |
| 6,134,835 A | 10/2000 | Krupke et al. |
| 6,155,327 A | 12/2000 | Wells et al. |
| 6,315,027 B1 | 11/2001 | Lichy |
| 6,327,744 B1 | 12/2001 | Dorma |
| 6,408,925 B1 | 6/2002 | Dorma |
| 6,442,897 B1 | 9/2002 | Mullet |
| 6,615,897 B2 | 9/2003 | Dorma |
| 7,036,548 B2 * | 5/2006 | Johnston et al. .............. 160/201 |
| RE39,504 E | 3/2007 | Scates et al. |
| 7,201,207 B2 | 4/2007 | Colston |
| 7,296,607 B2 | 11/2007 | Krupke et al. |
| 7,299,853 B2 | 11/2007 | Brown et al. |
| 7,686,061 B2 | 3/2010 | Mullet |
| 7,784,521 B2 | 8/2010 | Mullet et al. |
| 7,866,368 B2 | 1/2011 | Ostrovsky et al. |
| 2005/0166363 A1 | 8/2005 | Hoffman |
| 2005/0251958 A1 | 11/2005 | Coblentz et al. |
| 2005/0273976 A1 | 12/2005 | Sarver |
| 2006/0169424 A1 | 8/2006 | Griebel |
| 2011/0290431 A1 | 12/2011 | Ehrlich |

OTHER PUBLICATIONS

PCT/US2011/061711—Preliminary Patent Report dated Mar. 6, 2014 (9 pages).

\* cited by examiner

HINGED BOTTOM ROLLER ASSEMBLY AND COUNTERBALANCE MECHANISM FOR OVERHEAD DOOR

This application claims priority under 35 U.S.C. §119(e) to U.S. Provisional Patent Application Ser. No. 61/416,107 entitled HINGED BOTTOM ROLLER FOR OVERHEAD DOOR ASSEMBLY and filed Nov. 22, 2010, the entirety of which is hereby incorporated by reference herein.

Cross-reference is made to U.S. Utility application Ser. No. 13/113,144 entitled OVERHEAD DOOR ASSEMBLY FOR A STORAGE CONTAINER which was filed on May 23, 2011 by Rodney P. Ehrlich, the entirety of which is hereby expressly incorporated by reference herein.

FIELD OF THE INVENTION

The present invention relates generally to a movable overhead door assembly for a storage container, such as a truck trailer or garage, for example. In particular, the present invention relates to the bottom roller of the overhead door assembly.

BACKGROUND

Many storage containers, such as large truck trailers and garages, for example, include an overhead door constructed from longitudinal panels hingedly joined together and supported by rollers that ride in a pair of door guide tracks. The weight of the door may be balanced by a counterbalance mechanism including either a torsion spring system or a pair of extension springs, for example. The counterbalance mechanism is typically mounted on the header wall above the door of the trailer. The guide tracks are typically positioned on the outer sidewalls of the trailer and extend vertically upward from the floor of the opening to the top of the opening, where they then extend backward in a horizontal direction slightly below the roof of the enclosure. During operation, the rollers of the overhead door travel within the guide tracks and allow the door to be moved between a closed, vertical position and an opened, horizontal position.

SUMMARY

The present invention may comprise one or more of the features recited in the attached claims, and/or one or more of the following features and combinations thereof.

According to one aspect of the present disclosure, an overhead door assembly configured to be coupled to a storage container, such as a truck trailer, includes an overhead door including a plurality of door panels hingedly coupled to one another, and a bottom roller assembly coupled to a bottom panel of the door. The bottom hinge assembly includes (i) a hinge having an upper hinge plate coupled to the bottom panel of the door, a lower hinge plate, and a hinge joint pivotably coupling the upper and lower hinge plates to each other for movement relative to each other about a pivot axis defined along the hinge joint, and (ii) a roller coupled to the lower hinge plate. The roller includes a shaft and a roller wheel coupled to one end of the shaft. The lower hinge plate and the roller thereon configured to pivot about the pivot axis relative to the bottom panel of the door between a first position generally adjacent the bottom panel of the door and a second position spaced-apart from the bottom panel of the door.

In one illustrative embodiment of the present disclosure, the lower hinge plate may include a first end coupled to the hinge joint and a second end coupled to the roller such that the shaft of the roller is spaced-apart from the hinge joint when the lower hinge plate is in the first position. Illustratively, the first end of the lower hinge plate may define a first length and the second end may define a second length smaller than the first length. Further illustratively, a length of the shaft may be smaller than the first length of the lower hinge plate.

In another illustrative embodiment, the shaft may be configured to remain in an out-of-the-way position such that the shaft does not extend into a rear opening of the trailer when the door is in the opened position.

In still another illustrative embodiment, the shaft may be approximately 1.25 inches long.

In yet another illustrative embodiment, the upper hinge plate may be pivotably coupled to the bottom panel of the door to allow the hinge to pivot relative to the bottom door panel about a second pivot axis perpendicular to the pivot axis defined by the hinge joint.

In another illustrative embodiment, a distance between the roller assembly and the joint of the hinge may be adjustable.

In yet another illustrative embodiment, the door may be movable between a closed position wherein the bottom panel of the door is in a generally vertical orientation, and an opened position wherein the bottom panel of the door is in a generally horizontal orientation. Further, the hinge may be in the first position when the door is in the closed position and the hinge is in the second position when the door is in the opened position such that the lower hinge plate is spaced apart from the bottom door panel when the door is in the second position. Further illustratively, the bottom door panel may be configured to be positioned above a rear door opening of the trailer when the door is in the opened position.

In still another illustrative embodiment, the roller may be configured to lie adjacent the bottom panel of the door when the lower hinge plate is in a first position. Further, the roller may be configured to be spaced-apart from the bottom panel of the door when the lower hinge plate is in a second position.

In yet another illustrative embodiment, the roller may be configured to lie adjacent the bottom panel of the door when the bottom panel of the door is in a vertical position, and wherein the roller is configured to lie spaced-apart from the bottom panel of the door when the bottom panel of the door is in a horizontal position. Further illustratively, the roller may be vertically-aligned with the joint when the lower hinge plate is in a first position and the upper and lower hinge plates are positioned to lie in the same plane. Further, the roller may be laterally spaced-apart from the joint and the upper and lower hinge plates are angled relative to each other when the lower hinge plate is in the second position angled relative to each other.

According to another aspect of the present disclosure, an overhead door assembly configured to be coupled to a storage container, such as a truck trailer, includes an overhead door including a plurality of door panels hingedly coupled to one another, and a hinge having an upper hinge plate coupled directly to a bottom panel of the door, a lower hinge plate, and a hinge joint pivotably coupling the upper and lower hinge plates to each other for movement relative to each other about a pivot axis defined along the hinge joint. The overhead door assembly further includes a bottom roller coupled to a distal end of the lower hinge plate for movement with the lower hinge plate about the joint. Illustratively, the door is configured to move between a fully closed position wherein the bottom door panel is in a vertical orientation and the lower hinge plate and bottom roller are adjacent the bottom door panel, and a fully opened position wherein the bottom door panel is in a horizontal orientation and the lower hinge plate and bottom roller are spaced-apart from the bottom door panel.

In one illustrative embodiment, when the overhead door is in the fully opened position such that the bottom panel of the door is in the horizontal position, a bottom edge of the door may be configured to lie forward of a rear header of the overhead door assembly.

In another illustrative embodiment, the overhead door assembly may further include a stop mechanism configured to prevent upward movement of the bottom panel of the door beyond a predetermined location. Illustratively, the stop mechanism may generally be L-shaped and may be configured to be coupled to a header of the storage container. Further illustratively, the overhead door assembly may also include a counterbalance mechanism and the stop mechanism may be positioned below the counterbalance mechanism.

According to yet another aspect of the present disclosure, an overhead door assembly configured to be coupled to a storage container, such as a truck trailer, includes a door having a bottom door panel; and a bottom roller coupled to and extending outwardly from a lateral edge of the bottom door panel. Illustratively, the door is movable between a closed position wherein the bottom door panel is in a vertical position and an opened position wherein the bottom door panel is in a horizontal position. Further illustratively, the bottom roller is adjacent the bottom door panel when the door is in the closed position, and is spaced-apart from the bottom door panel when the door is in the opened position.

In one illustrative embodiment, the overhead door assembly may further include a hinge having an upper hinge plate coupled directly to the bottom door panel and a lower hinge plate pivotably coupled to the upper hinge plate. The bottom roller may be coupled to a distal end of the lower hinge plate. Further, the hinge may be in a planar configuration when the bottom door panel is in the vertical position and the hinge may be in an angled configuration when the bottom door panel is in the horizontal orientation. Illustratively, the lower hinge plate and the roller may be movable relative to the bottom door panel about a pivot axis of the hinge.

According to one aspect of the present disclosure, an overhead door assembly configured to be coupled to a storage container, such as a truck trailer, includes a guide track system configured to be coupled to one of the sidewalls of the storage container and a door assembly. The guide track system includes a first guide track having a horizontal section and a vertical section. The door assembly includes a door and a plurality of rollers coupled to the door and extending outwardly from a lateral edge of the door. Each of the plurality of rollers is received within the guide track system. The overhead door assembly further includes a hinge coupled to the door and to one of the plurality of rollers to allow a portion of the door to be spaced-apart from the one of the plurality of rollers when the door is in an opened position.

In one illustrative embodiment, the hinge may include a first plate coupled directly to the door and a second plate coupled to the one of the plurality of rollers. The second plate may be movable relative to the door.

In another illustrative embodiment, the hinge may be coupled to a bottom panel of the door and to a bottom roller of the plurality of rollers. Illustratively, the door may be movable between a closed position wherein the bottom panel of the door is in a generally vertical orientation, and an opened position wherein the bottom panel of the door is in a generally horizontal orientation. Further illustratively, the door may include a plurality of panels and a pivot axis of the hinge may be spaced-apart from a junction between two adjacent panels.

Additionally, or alternatively, a portion of the bottom door panel may be spaced-apart from the first guide track when the door is in the opened position. Further additionally, or alternatively, the bottom door panel may be configured to be positioned above a rear door opening of the storage container when the door is in the opened position.

In still another illustrative embodiment, the door assembly may further include a mounting bracket coupled to (i) the one of the plurality of rollers and (ii) the hinge. Illustratively, the hinge may include a first plate coupled directly to the door and a second plate coupled directly to the mounting bracket. Illustratively, wherein the second plate, the mounting bracket, and the roller may be configured to move together relative to the first plate and the door.

According to another aspect of the present disclosure, an overhead door assembly configured to be coupled to a storage container, such as a truck trailer, includes a door assembly including a door having a plurality of door panels hingedly coupled to one another, and a plurality of rollers coupled to the door and extending outwardly from a lateral edge of the door. The overhead door assembly further includes a hinge having a first plate coupled directly to a bottom panel of the door and a second plate coupled directly to a bottom roller of the plurality of rollers. The hinge is movable between (i) a planar configuration whereby the first plate and the second plate are generally parallel to each other and the bottom roller is adjacent the bottom panel of the door, and (ii) an angled configuration whereby the first plate and the second plate are angled relative to each other and the bottom roller is spaced-apart from the bottom panel of the door.

In one illustrative embodiment, the bottom roller may include a mounting bracket and the second plate of the hinge may be coupled directly to the mounting bracket.

In another illustrative embodiment, the door may be movable between an closed position wherein the hinge is in the planar configuration and a open position wherein the hinge is in the angled configuration. Illustratively, the bottom panel of the door may be in a generally horizontal position when the door is in the opened position. Further illustratively, the bottom panel of the door may be in a vertical position when the door is in the closed position.

In still another illustrative embodiment, the bottom panel may be configured to lie within a header space of the storage container when the door is in the opened position. Illustratively, the overhead door assembly may also include a counterbalance housing. An inside surface of the bottom panel of the door may be aligned with or positioned above a bottom surface of a counterbalance housing.

In yet another illustrative embodiment, the overhead door assembly may further include a stop mechanism configured to prevent upward movement of the bottom panel of the door beyond a predetermined location. Illustratively, the stop mechanism may be generally L-shaped and may be configured to be coupled to a header of the storage container. Further illustratively, the overhead door assembly may also include a counterbalance mechanism and the stop mechanism may be positioned below the counterbalance mechanism.

According to still another aspect of the present disclosure, an overhead door assembly configured to be coupled to a storage container, such as a truck trailer, includes a door having a bottom door panel, and a bottom roller coupled to and extending outwardly from a lateral edge of the bottom door panel. Illustratively, the door is movable between a closed position wherein the bottom panel is in a vertical position and an opened position wherein the bottom panel is in a horizontal position. Further illustratively, the bottom roller is adjacent the bottom panel when the door is in the closed position, and the bottom roller is spaced-apart from the bottom panel when the door is in the opened position.

Illustratively, the overhead door assembly may also include a hinge having a first plate coupled directly to the bottom panel of the door and a second plate coupled directly to the bottom roller.

A hinged bottom roller assembly configured to be coupled to a bottom panel of an overhead door configured for use with a trailer, for example, includes a hinge including (i) an upper hinge plate configured to be coupled to the bottom panel of the overhead door, (ii) a lower hinge plate, and (iii) a hinge joint pivotably coupling the upper and lower hinge plates to each other for movement relative to each other about a pivot axis defined along the hinge joint. The hinged bottom roller assembly further includes a roller coupled to a distal end of the lower hinge plate such that a shaft of the roller is vertically spaced apart from the hinge joint. Illustratively, the hinge is movable between a first position wherein the upper and lower hinge plates are positioned to lie in the same plane and the shaft of the roller assembly is in the same plane as the pivot axis, and a second position wherein the upper and lower hinge plates are angled relative to each other and the shaft of the roller is laterally spaced-apart from the pivot axis.

According to still another aspect of the present disclosure, a hinged bottom roller assembly configured to be coupled to a bottom panel of an overhead door configured for use with a trailer, for example, includes a hinge including (i) an upper hinge plate configured to be coupled to the bottom panel of the overhead door, (ii) a lower hinge plate, and (iii) a hinge joint pivotably coupling the upper and lower hinge plates to each other for movement relative to each other about a pivot axis defined along the hinge joint. The hinged bottom roller assembly further includes a roller coupled to the hinge. Illustratively, the roller including a shaft and a roller wheel coupled to one end of the shaft. Further illustratively, the lower hinge plate is configured to pivot about the pivot axis relative to the bottom panel of the door between a first position configured to lie generally adjacent the bottom panel to a second position configured to be spaced-apart from the bottom panel.

In one illustrative embodiment, the shaft of the roller may be configured to be vertically-aligned with the hinge joint when the door is in a closed position.

In another illustrative embodiment, the lower hinge plate may include a first end coupled to the hinge joint and a second end coupled to the roller assembly such that the shaft of the roller assembly is spaced-apart from the hinge joint. Illustratively, the first end may define a first length and the second end may define a second length smaller than the first length. Further illustratively, the lower hinge plate may include an outer edge extending between the first end and the second end, and a second edge extending between the first end and the second end. Further, the second edge may be curved inwardly toward the first edge from the first end and second end.

In still another illustrative embodiment, the roller may be configured to pivot about the pivot axis with the lower hinge plate relative to the upper hinge plate and relative to the bottom door panel.

In yet another illustrative embodiment, the upper hinge plate may be configured to pivot relative to the door about a second pivot axis perpendicular to the pivot axis defined by the hinge joint.

In still another illustrative embodiment, the hinge joint may define a first length and the shaft of the roller may define a second length smaller than the first length. Further illustratively, a distal end of the shaft of the roller may include a groove formed therein, and wherein a retainer may be received within the groove.

In yet another illustrative embodiment, the shaft of the roller may not extend into the rear opening of the trailer when the door is in the fully opened position.

In still another illustrative embodiment, a distance between the roller and the joint of the hinge may be adjustable.

In yet another illustrative embodiment, the roller may be configured to lie adjacent the bottom panel of the door when the hinge assembly is in a first position. Further illustratively, the roller may be configured to be spaced apart from the bottom panel of the door when the hinge is in a second position.

In still another illustrative embodiment, the roller may be configured to lie adjacent the bottom panel of the door when the bottom panel of the door is in a vertical position. Further, the roller may be configured to lie spaced-apart from the bottom panel of the door when the bottom panel of the door is in a horizontal position. Illustratively, the roller may be vertically-aligned with the joint when the hinge is in a first position such that the upper and lower hinge plates are positioned to lie in the same plane. Further, the roller may be laterally spaced-apart from the joint when the upper and lower hinge plates are in a second position angled relative to each other. Illustratively, the lower hinge plate may be configured to engage the bottom panel of the door when the hinge assembly is in the first position. Further, the lower hinge plate may be configured to be spaced-apart from the bottom panel of the door when the hinge is in the second position.

According to another aspect of the present disclosure, a counterbalance assembly for an overhead door includes a first counterbalance mechanism including a first adjustor for adjusting the tension force of the counterbalance mechanism, and a second counterbalance mechanism including a second adjustor for adjusting the tension force of the counterbalance mechanism. The counterbalance assembly is mounted in the header of a trailer and is operable to counterbalance an overhead door of the trailer.

In one illustrative embodiment, the first counterbalance mechanism may further include a support shaft, a cable drum rotatably supported on the support shaft, a winding cone coupled to the cable drum, a stationary cone, and a tension spring secured to the winding cone and the stationary cone. Illustratively, the stationary cone of the first counterbalance mechanism may be secured to the adjuster and rotatable relative to the support to change the preload in the tension spring. Further illustratively, the adjustor of the first counterbalance mechanism may be secured to the support shaft.

In another illustrative embodiment, the adjustor of the first counterbalance mechanism may include a body, a pinion gear supported in the body for rotation relative to the body, and a worm gear engaged with the pinion gear such that rotation of the worm gear rotates the pinion gear. Illustratively, the rotation of the pinion gear may cause the stationary cone to rotate relative to the shaft.

In still another illustrative embodiment, the second counterbalance mechanism may further include a support shaft, a cable drum rotatably supported on the support shaft, a winding cone coupled to the cable drum, a stationary cone, and a tension spring secured to the winding cone and the stationary cone. Illustratively, the stationary cone of the second counterbalance mechanism may be secured to the adjuster and may be rotatable relative to the support to change the preload in the tension spring. Further illustratively, the adjustor of the second counterbalance mechanism may be secured to the support shaft. The adjustor of the second counterbalance mechanism may include a body, a pinion gear supported in the body for rotation relative to the body, and a worm gear engaged with the pinion gear such that rotation of the worm gear rotates the pinion gear. Illustratively, the rotation of the pinion gear may cause the stationary cone to rotate relative to the shaft.

According to another aspect of the present disclosure, a counterbalance assembly for an overhead door includes a counterbalance mechanism having a stationary shaft and an adjustor coupled to the shaft for adjusting a tension force of the counterbalance mechanism. Illustratively, the counterbalance mechanism further includes first and second cable drums rotatably mounted to either end of the shaft, a winding cone coupled each cable drum, a stationary cone associated with each winding cone, and a tension spring secured to each winding cone and stationary cone. The adjustor is secured to the support shaft and includes a body, a pinion gear supported in the body for rotation relative to the body, and a worm gear engaged with the pinion gear such that the rotation of the worm gear rotates the pinion gear. Illustratively, the rotation of the pinion gear causes the stationary cone to rotate relative to the shaft.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage containers, as well as refrigerated and un-refrigerated trailers, storage containers, or truck bodies which include an overheard door assembly.

Figure 1:
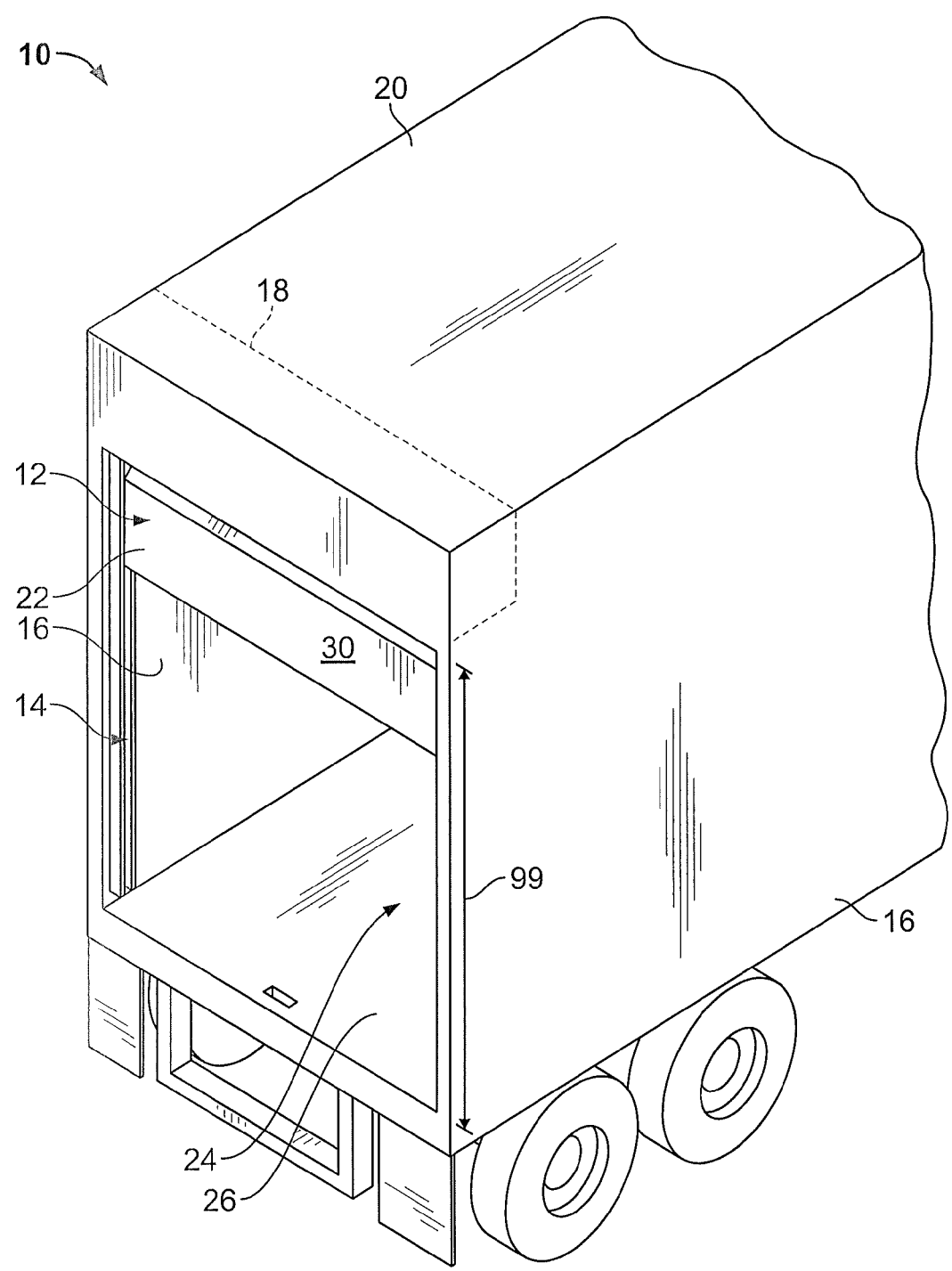
FIG. 1 is a rear, perspective view of a portion of a truck trailer including an overhead door assembly and showing a door of the assembly in a partially-opened position.

As shown in FIG. 1, a truck trailer 10 includes an overhead door assembly 12 at the rear of the trailer 10. Illustratively, as is discussed in greater detail below, the overhead door assembly 12 includes first and second guide track systems 14 each coupled to one of the two sidewalls 16 of the trailer 10, a rotational counterbalance mechanism 18 coupled to the roof 20 of the trailer 10, and an overhead door 22 coupled to both the guide track systems 14 and the counterbalance mechanism 18. The overhead door 22 operates to close a rear door opening 24 of the trailer 10 defined by the sidewalls 16 of the trailer 10, a floor 26 of the trailer 10, and the roof 20 of the trailer 10.

Figure 2:
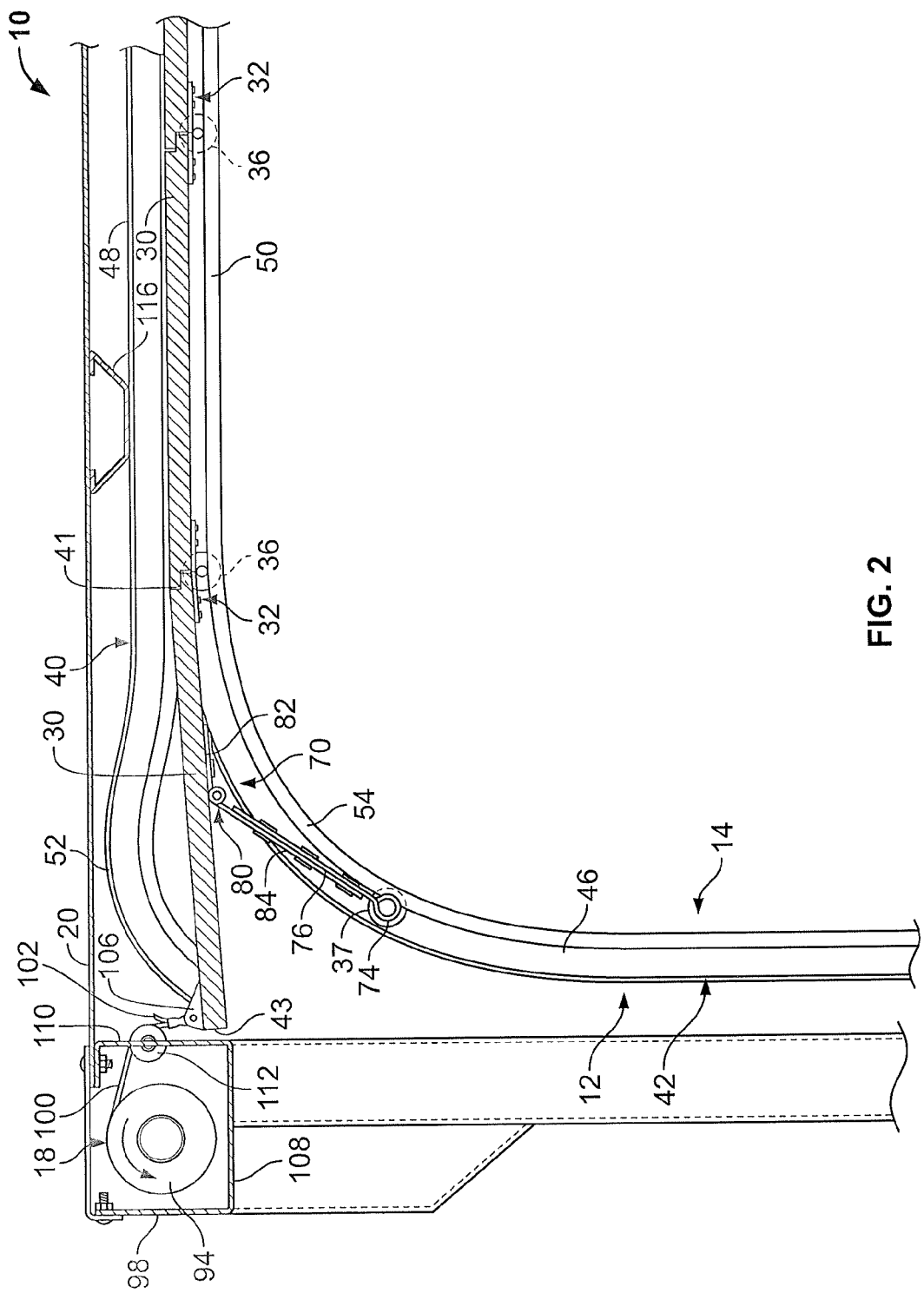
FIG. 2 is a side view of a portion of the overhead door assembly showing the door in a fully opened, horizontal position and showing a bottom roller of the door assembly hingedly coupled to and spaced-apart from the door.
Figure 3:
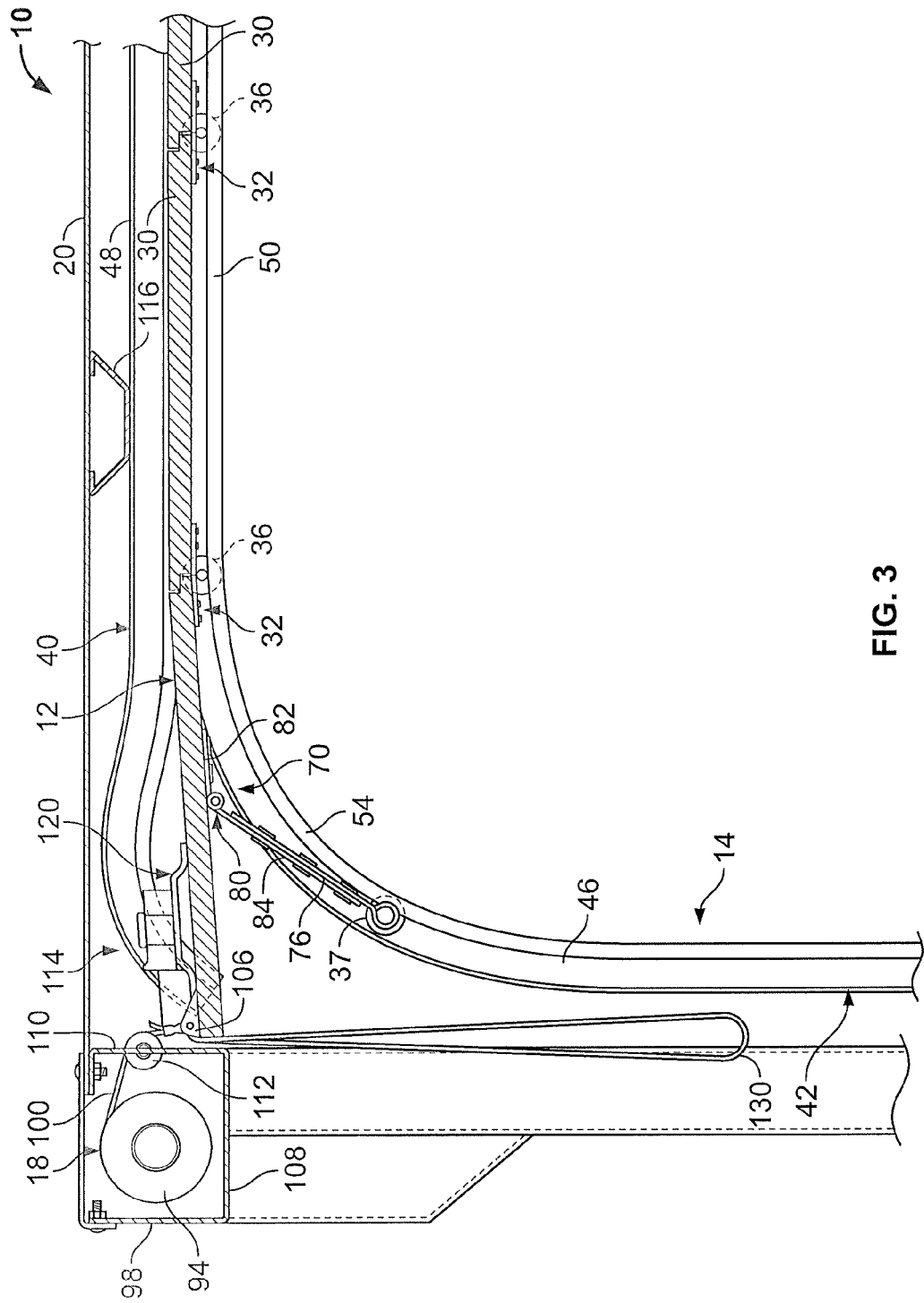
FIG. 3 is a side view of the portion of an overhead door assembly similar to FIG. 2 showing a pull-strap to allow a user to pull the door toward a closed position and showing a door handle and latch mechanism mounted to the door and located within a header space of the trailer.

Illustratively, the overhead door 22 is movable relative to the guide track systems 14 between a vertical, fully closed position (shown in FIGS. 4 and 5) and a horizontal, fully opened position (shown in FIGS. 2 and 3). The overhead door 22 includes a plurality of lateral panels 30 coupled together by hinges 32 (shown in FIGS. 2-4) to allow the door 22 to move along the track systems 14 between the opened and closed positions. In other words, the lateral panels 30 are disposed one on top of the other with each panel 30 hinged to the panel 30 above. Each hinge 32 illustratively includes a first hinge plate coupled directly to one of the lateral panels 30 and a second hinge plate coupled directly to an adjacent lateral panel 30 such that the pivot joint or pivot axis of each hinge 32 is generally aligned with the abutting top and bottom end surfaces of adjacent lateral panels 30.

Figure 4:
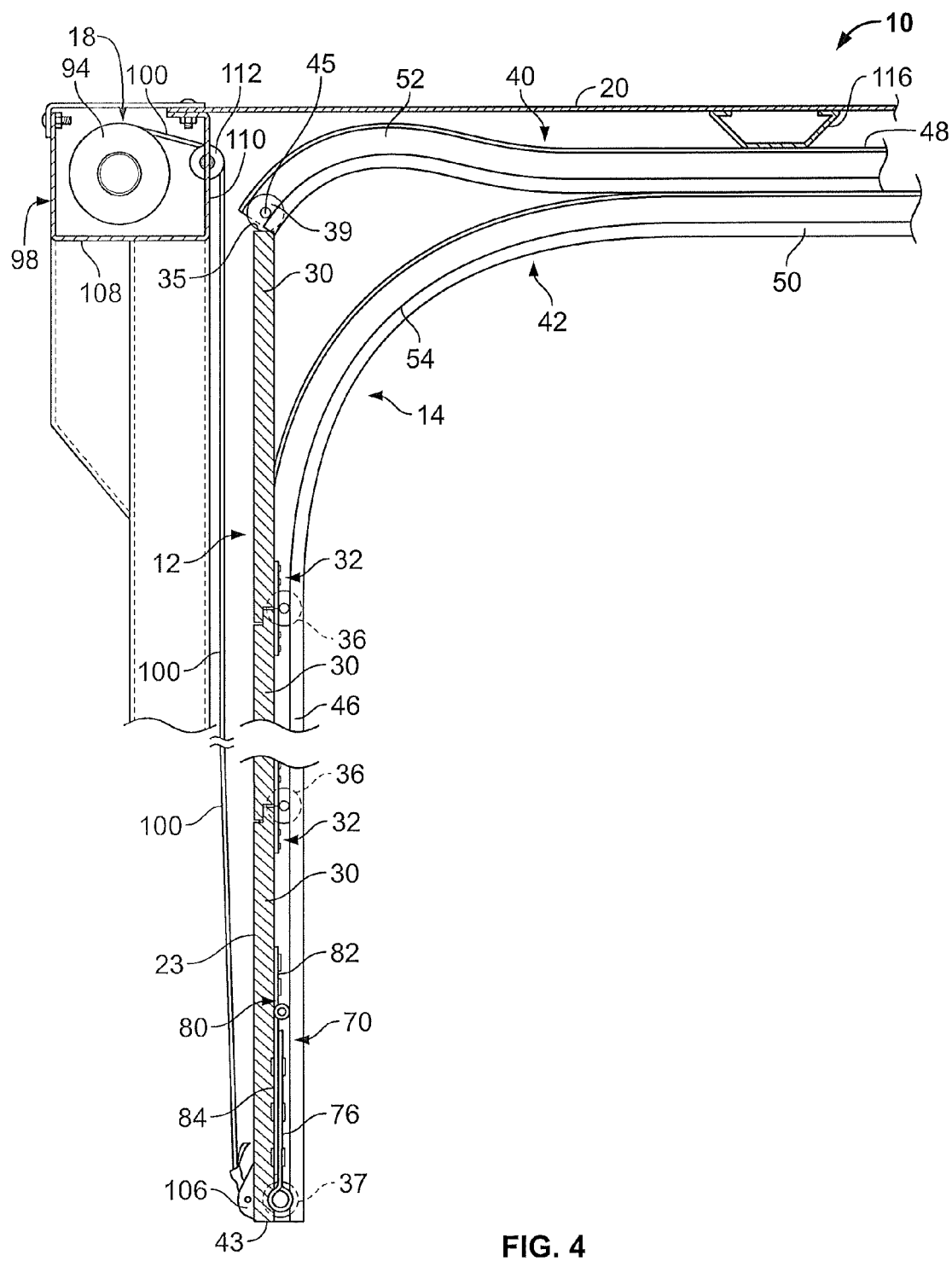
FIG. 4 is a side view of a portion of the overhead door assembly showing the door in a fully closed, vertical position and showing the bottom roller of the door assembly adjacent the door.
Figure 5:
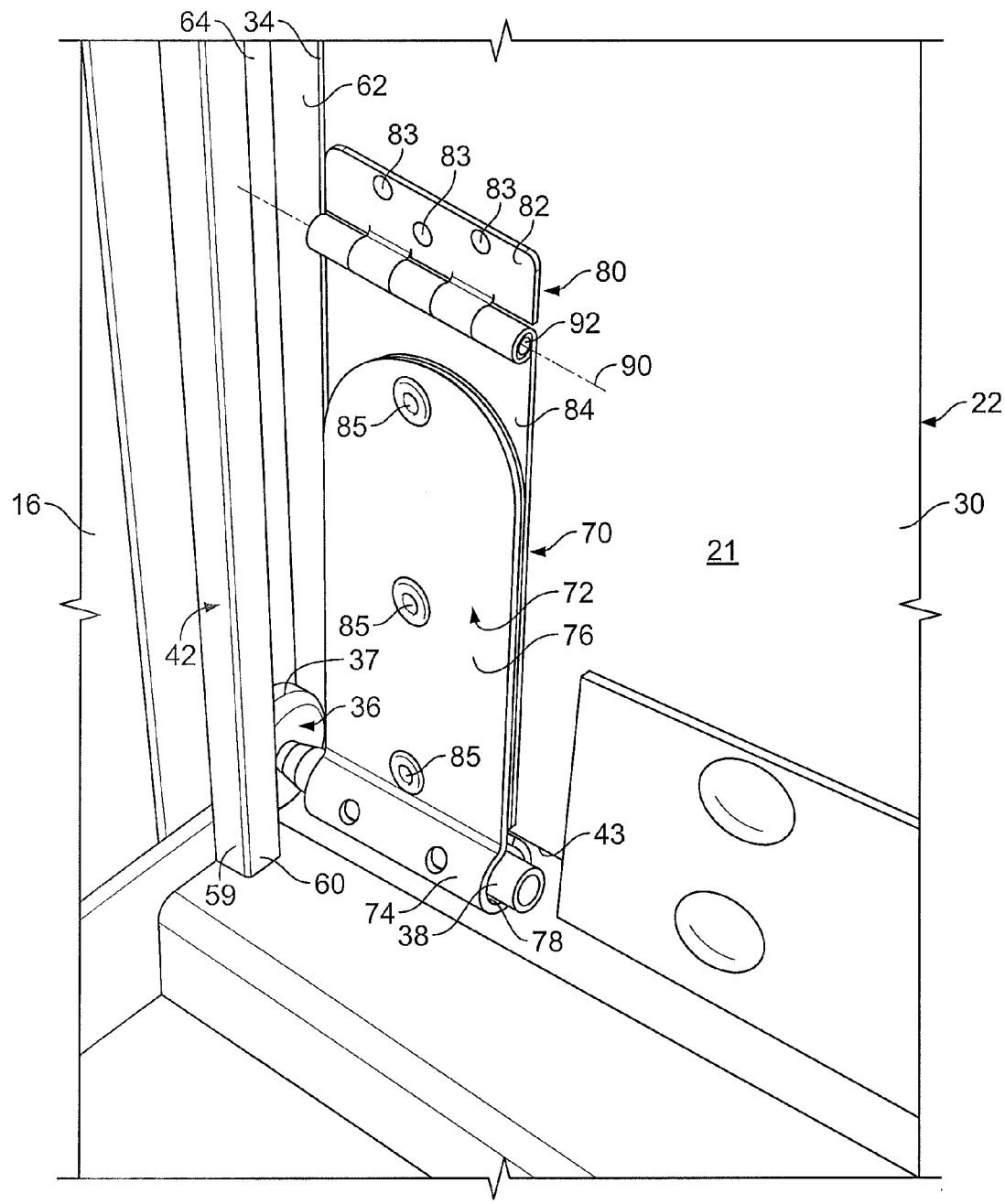
FIG. 5 is a perspective view of a lower portion of the overhead door assembly showing the bottom roller hingedly coupled to the door and received within a guide track of the door assembly.

Illustratively, each panel 30 of the door 22 includes a pair of lateral edge surfaces 34 (one of which is shown in FIG. 5) which extend parallel to the direction of movement of the door 22 between the opened and closed positions. A series of rollers 36, including roller wheels 37 and corresponding shafts 38, is spaced along the length of each of the lateral edge surfaces 34. Each roller wheel 37 is attached to the door 22 by the corresponding shafts 38. As shown in FIGS. 2-4, a roller 36 is associated with each hinge 32 such that the door 22 includes a roller 36 located at the junction between each lateral panel 30 of the door 22. Each roller wheel 37 is able to rotate about the respective shaft 38 and is positioned within one of the respective first and second guide track systems 14. Each roller wheel 37 and shaft 38 cooperate to define a roller such that the door 22 includes a plurality of roller assemblies attached adjacent the opposite, lateral edges 34 thereof. Illustratively, while the rollers 36 are coupled to each hinge 32, it is within the scope of this disclosure to couple the rollers 36 to the door panels 30 at other suitable locations and to provide any suitable numbers of rollers 36 on the door 22 in order to allow the door 22 to move along the guide track systems 14 between the opened and closed positions.

Illustratively, as noted above, the overhead door assembly 12 includes the right and left guide track systems 14 such that each guide track system 14 is rigidly coupled to one of the two sidewalls 16 of the trailer 10. The first and second guide track systems 14 are provided on either side of the doorway 24 at the rear end of the trailer 10 for receiving the rollers 36 disposed on the lateral edges 34 of the panels 30. While the overhead door assembly 12 includes two separate guide track systems, i.e., the right and left guide track systems 14, for purposes of simplicity, only the left guide track system 14 is shown and described herein. It should be understood, however, that the right guide track system is generally identical to the left guide track system and includes the same or similar components. Accordingly, although only the left guide track system 14 is shown, an identical, right guide track system is positioned along the interior of the opposite sidewall 16 such that the rollers 36 on each lateral edge 34 of the door 22 are positioned within one of respective guide track systems. In this manner, the rollers 36 travel within a guide track system and enable the overhead door 22 to move from the vertical, closed position to the horizontal, opened position.

As shown in FIGS. 2 and 3, the guide track system 14 includes first and second guide tracks 40, 42. The first guide track 40 is positioned slightly below the roof 20 of the trailer 10 and includes a curved section 52 adjacent the rear end of the trailer 10 near the door opening 24 and a generally horizontal section 48 extending parallel to the roof 20 in a direction toward a front end of the trailer 10. The second guide track 42 extends upwardly from the floor 26 of the door opening 24 and along the interior surface of the sidewall 16 of the trailer 10 until the track 42 reaches a position slightly below the roof 20 of the trailer 10. Upon reaching an area near the roof 20, the guide track 42 bends to create a curved portion and then continues in a generally horizontal direction parallel to the roof 20. As such, the second guide track 42 includes a vertical section 46, a horizontal section 50 positioned just below the horizontal section 48 of the first track 40, and a curved section 54 interconnecting the respective vertical and horizontal sections 46, 50. Illustratively, the horizontal section 48 of the first guide track 40 is positioned generally outside, or above, the horizontal section 50 of the second, or inner, guide track 42.

Illustratively, the guide track system 14 is similar to the guide track system disclosed in U.S. patent application Ser. No. 13/113,144 entitled OVERHEAD DOOR ASSEMBLY FOR A STORAGE CONTAINER which was filed on May 23, 2011, the entirety of which is hereby expressly incorporated by reference herein. As such, a more detailed discussion of the structure and operation of the guide track system 14 can be found therein.

As shown in FIG. 5, the second guide track 42 has a generally "c-shaped" cross-section including a bottom wall 59, an inner wall 60, an outer, or top, wall 62 opposite the bottom wall 59, and a back wall 64. This generally c-shaped structure of the track 42 operates to maintain the rollers 36 therein during movement of the door 22 between the closed position and the opened position. Illustratively, the back wall 64 of the guide track 42 is in contact with or in close proximity to the sidewall 16 of the trailer 10. Although not shown, the overhead door assembly 12 includes mounting brackets to mount the guide tracks 40, 42 to the sidewalls 16 of the trailer 10. Further, though not shown, the cross-sectional shape of the guide track 40 is generally the same as or similar to the cross-sectional shape of the guide track 42 to maintain any rollers of the door 22 therein during operation of the door assembly 12. While the particular shape and structure of the guide tracks 40, 42 is shown and described herein, it is within the scope of this disclosure for the guide tracks 40, 42 to define other cross-sectional shapes suitable for guiding rollers of the door 22 during movement of the door 22 between the opened and closed positions.

Illustratively, the rollers 36 of the door 22 are offset rollers 36 in that the shaft 38 associated with each roller 36 is positioned adjacent and coupled to the inside surface 21 of the door 22. As such, the axis of rotation of these offset rollers 36 (i.e., along the longitudinal axis of the respective shaft 38) is laterally offset, or spaced-apart, from a longitudinal axis of the lateral edge 34 of the door 22. In some embodiments, the shaft 38 may be positioned such that the longitudinal axis of the shaft 38 is coincident with the inside plane of the panels 30 of the door 22. This may be accomplished by forming a recess in the panel 30 such that the shaft 38 is partially recessed into the panel 30.

As shown in FIG. 4, the door assembly further includes a top end roller 39 positioned within the first guide track 40. Illustratively, the top end roller 39 is not laterally offset from the longitudinal axis of the lateral edge 34 of the door 22. Rather, the axis of rotation 45 of the top roller 39 is generally aligned with the longitudinal axis of the lateral edge 34 of the door 22. Further illustratively, the axis of rotation 45 is generally above (both directly above and offset laterally, but above) the top edge 35 of the door 22. As is discussed in greater detail within U.S. Utility application Ser. No. 13/113,144 entitled OVERHEAD DOOR ASSEMBLY FOR A STORAGE CONTAINER, the entirety of which is incorporated by reference herein, the top roller, such as the top roller 39, may be positioned such that the top roller 39 rotates about the axis or rotation 45 aligned with the longitudinal axis of the lateral edge of the door. Alternatively, a rearmost portion of the top roller 39 may be aligned with or positioned forward of a generally vertical plane defined by the outer surface of the door 22 when the door 22 is in the fully closed, generally vertical position. Further, the axis of rotation 45 of the top roller 39 may also be laterally spaced-apart from the longitudinal axis of the lateral edge of the door assembly 12.

During operation of the door assembly 12, the top roller 39 remains within the first guide track 40 while the offset rollers 36 remain within the second guide track 42. As the door 22 is raised, the top end roller 39 rides along the outer guide track 40 from its location within the curved section 52 (as shown in FIG. 4) into the horizontal section 48 of the outer guide track 40. The offset rollers 36, on the other hand, remain within the inner guide track 42 during movement of the door 22 from the fully closed position to the fully opened position. As such, the offset rollers 36 each move from their location within the vertical section 46 of the inner guide track 42, through the curved section 54 of the inner guide track 42, and into the horizontal section 50 of the inner guide track 42.

Looking now to FIG. 5, a bottom roller assembly 70 is provided which allows the bottom panel 30 of the door 22 to move to a generally horizontal position above the rear opening 24 of the trailer 10 when the door 22 is in the fully opened position, as shown in FIGS. 2 and 3. The roller assembly 70 includes a bottom roller wheel 37 of the offset rollers 36 which is hingedly mounted to the lower portion of the bottom panel 30 of the door 22, as shown in FIG. 5. Illustratively, the roller assembly 70 operates to allow the door panel 30 and the bottom roller wheel 37 to move away from each other when the door 22 is in the fully opened position, as shown in FIGS. 2 and 3. Illustratively, it should be understood that while only one hinged bottom roller assembly 70 is shown in the figures and described herein, the overhead door assembly 12 includes both a right bottom roller assembly 70 and a left bottom roller assembly 70, each configured to cooperate with the respective right and left guide track systems 14 of the overhead door assembly 12.

The roller assembly 70 includes a roller bracket 72 having a shaft-receiving portion 74 configured to receive the shaft 38 of the bottom roller wheel 37 therethrough, and a mount portion 76 extending upwardly from the shaft-receiving portion 74. Illustratively, the shaft-receiving portion 74 defines a passageway 78 configured to receive the shaft 38 of the bottom roller wheel 37 therein and the mount portion 76 defines a generally planar plate. The roller assembly 70 further includes a butt hinge 80 coupled to the bottom panel 30 of the door 22 and the roller bracket 72.

In particular, the hinge 80 includes a first, or upper, hinge plate 82 coupled directly to the bottom panel 30 of the door 30 adjacent the outer edge 34 of the door 22. The first hinge plate 82 is coupled to the panel 30 using screws 83; however, any suitable fasteners, such as rivets, nails, bolts, welds, etc., may be used as well. The butt hinge 80 further includes a second, or lower, hinge plate 84 coupled directly to the mount portion 76 of the roller bracket 72. Illustratively, the mount portion 76 and the second hinge plate 84 are coupled to each other using rivets 85; however, any suitable fasteners, such as screws, nails, bolts, welds, etc., may be used as well. A hinge joint 85 is formed between the first and second hinge plates 82, 84 and allows the hinge plates 82, 84 to pivot relative to each other. As is discussed in greater detail below, the second hinge plate 84 is not directly coupled to the bottom panel 30 of the door 22 and as such, is able to move relative to the bottom panel 30 of the door 22. Illustratively, it should be understood that while the roller assembly 70 includes the roller bracket 72 for coupling the roller wheel 37 to the second hinge plate 84, it is within the scope of this disclosure to couple the roller wheel 37 directly to the second hinge plate 84. As shown in FIG. 5, the hinge 80 defines a pivot axis 90 through the pin 92 of the joint of the hinge 80. This pivot axis 90 is not aligned with the junction or abutting ends of the any two adjacent panels 30 of the door 22. Rather, the pivot axis 90 is spaced apart from both the top and bottom ends 41, 43 of the bottom panel 30. Illustratively, the second hinge plate 84 is not directly coupled to the inside surface 21 of the door panel 30. Rather, the second hinge plate 84 is only directly coupled to the mount portion 76 of the roller bracket 72 in order to move with the roller bracket 72 during operation of the door assembly 12 between the opened and closed positions, as described in greater detail below. Further, because the first hinge plate 82 is directly coupled to the door panel 30 and the second hinge plate 84 is movable relative to the first hinge plate 82 about the axis 90, the second hinge plate 84 and the mount portion 76 of the roller bracket 72 are movable relative to the door panel 30 as the door 22 of the door assembly 12 moves between the opened and closed positions. As is discussed in greater detail below, therefore, the bottom roller wheel 37 is also movable with both the roller bracket 72 and the second hinge plate 84 relative to the door panel 30 as the door 22 is moved between the opened and closed positions.

Looking still to FIGS. 2-4, the overhead door assembly 12 further includes the counterbalance mechanism 18. As is generally understood by one skilled in the art, overhead doors generally require a counterbalancing force which allows the door to be more easily moved between the opened and closed positions. Such counterbalancing force for the overhead door assembly 12 of the present disclosure is provided by the illustrative counterbalance mechanism 18.

Illustratively, the counterbalance mechanism 18 is a torsion spring counterbalance mechanism and includes a lateral torsion bar (not shown), a cable drum 94 positioned at each end of the bar, and one or more torsion springs (not shown) wound around the bar. Illustratively, the torsion springs may be helical torsion springs or other suitable springs or tensioning devices known to those skilled in the art. Further, while the particular counterbalance mechanism 18 disclosed herein is a torsion spring counterbalance mechanism, it is within the scope of this disclosure to alternatively provide a counterbalance mechanism using extension springs as well.

As is generally understood by one skilled in the art, the torsion spring includes a first end operatively connected to the torsion shaft and another end operatively connected to a winding mechanism (not shown) of the counterbalance mechanism 18. The torsion shaft is supported for rotation between the fixed supports and the drums, which are rigidly affixed to the torsion shaft, and is urged to rotate therewith. The torsion springs of the counterbalance mechanism 18 are typically wound during the installation of the overhead door assembly 12 such that they are provided with the necessary preset torque. The gear winding mechanism is provided for setting the appropriate torque or number of winds in the spring. A counter may also be provided to indicate to the installer the number of winds being given to the spring. One illustrative counterbalance mechanism, including an illustrative winding mechanism, is disclosed in U.S. Pat. No. 5,632,063, the disclosure of which is hereby incorporated by reference herein. During operation, the torsion shaft rotates to allow the raising and lowering of the door 22.

As further shown, the counterbalance mechanism 18 is contained within a counterbalancing housing, or header, 98. The housing 98 is coupled to and extends downwardly from an inside surface of the roof 20 of the trailer 10. As shown in FIGS. 2-4, the counterbalance mechanism 18 is contained entirely within the header 98 such that the sidewalls of the header 98 operate to surround and enclose the counterbalance mechanism 18. Illustratively, the housing 98 has a height of approximately three and a half inches and extends laterally across the width of the trailer 10. As shown in FIGS. 1-4, the housing 98, and thus the counterbalance mechanism 18 contained therein, is positioned at the rear end of the trailer 10. As such, the counterbalance mechanism 18 is located rearward of the door 22 when the door 22 is in the horizontal, opened position, as shown in FIGS. 2 and 3.

Illustratively, the counterbalance mechanism 18 further includes two steel counterbalance cables 100 each having a first end (not shown) coupled to the drum 94 of the counterbalance mechanism 18 and a second end 102 coupled to the door 22 of the door assembly 12. While the overhead door assembly 12 includes both right and left counterbalance cables 100, only the left cable associated with the left guide track system 14 is shown and described herein. It should be understood, however, that the right cable is generally identical to the left cable and includes the same or similar components. Illustratively, the first end of the cable 100 is coupled to the respective cable drum 94 of the counterbalance mechanism 18 and is configured to be wound around the drum 94 as the door 22 is moved to the opened position. Illustratively, the second end 102 of the cable 100 is coupled to the bottom-most door panel 30, as shown in FIGS. 2-4. Specifically, the second end 102 of the cable 100 is coupled to a bracket 106 illustratively coupled to the outside surface 23 of the bottom end of the bottom panel 30 of the door 22. It should be understood, however, that while the cable 100 is coupled to the bracket 106 of the door 22, that the cable 100 may alternatively be coupled directly to the door panel 30 and/or may be coupled to any suitable location on the bottom door panel 30.

In use, the overhead door assembly 12 operates to allow the door 22 to move between the fully closed, vertical position shown in FIG. 4 to the opened, horizontal position shown in FIGS. 2 and 3. When the door 22 is raised and moved toward the fully opened position, the torsion spring of the counterbalance mechanism 18 unwinds such that stored tension in the spring operates to help lift the door 22 by turning the torsion shaft, thus turning the cable drums 94 in the counterclockwise direction shown in FIGS. 2 and 3 in order to wrap the cable 100 around cable-receiving grooves in the cable drum 94. In other words, the counterbalance mechanism 18 is used to help lift the weight of the door 22 while the cable 100 operates to pull the bottom end of the door 22 vertically along the guide track system 14. As such, when the door 22 is lowered, the cable 100 unwraps from the drum 94 and the torsion spring is rewound about the torsion shaft to full tension.

As shown in FIG. 2, the counterbalance mechanism 18 is configured such that the cable drum 94 turns counterclockwise when winding the cable 100 to move the door 22 to the fully opened position. Conversely, the cable drum 94 turns clockwise when unwrapping the cable 100 in order to move the door 22 to the fully closed position. As such, the cable 100 is configured to exit the drum 94 at or near the upper right quadrant of the drum 94, as shown in FIG. 2. This allows the counterbalance mechanism 18 to pull the bottom panel 30 of the door 22 farther upwardly toward the roof assembly 22 than if the cable 100 were to exit from the bottom of the cable drum 94 or directly from the side of the cable drum 94. An aperture (not shown) is provided through the vertical wall 110 of the counterbalance housing 98 in order to allow the cable 100 to be threaded therethrough and attached to the bracket 106 on the door 22. Illustratively, a guide roller 112 is also provided in order to guide the cable 100 as the cable 100 exits and enters the counterbalance housing 98. Illustratively, as shown in FIGS. 2-4, guide roller 112 is also located generally within the aperture formed in the forward-most vertical wall 110 of the counterbalance housing 98 in order to guide the cable 100 as the cable 100 passes through the housing 98. It is also within the scope of the disclosure, however, for the guide roller 112 to be located at some other suitable location, such as at a location forward of the vertical wall 110 of the housing 98, for example. Illustratively, the guide roller 112 is mounted to the vertical wall 110 of the housing 98 for rotation about and axis relative therewith. As shown in FIGS. 2-4, the cable 110 is routed over the guide roller 112 to guide the movement of the cable 100 as the door 22 is moved between the fully opened and fully closed positions.

Illustratively, when the door 22 is in the fully closed, vertical position, as shown in FIG. 4, the hinge 80 is in an opened, vertical position such that the first and second hinge plates 82, 84 are generally parallel to each other. In other words, when the door is in the fully closed position, the first and second hinge plates 82, 84 are in a planar configuration such that they are generally positioned to lie in the same plane. Further, when the door 22 is in the fully closed, vertical position, the bottom panel 30 of the door 22 is positioned adjacent the second hinge plate 84 such that the inside surface 21 of the bottom panel 30 of the door 22 is adjacent to and engaged with a rear, facing surface of the second hinge plate 84. As such, the second hinge plate 84 defines a plane generally parallel to a plane defined by the inside surface 21 of the door panel 30. Furthermore, when the door 22 is in the closed, vertical position, as shown in FIG. 5, the bottom panel 30 of the door 22 is also positioned adjacent the bottom roller wheel 37. Illustratively, in this orientation, the bottom roller wheel 37 is positioned within the vertical section 46 of the second guide track 42. The outer, lateral edge 34 of the door 22 is generally parallel to the vertical section 46 of the second guide track 42. Further, as mentioned above, the second hinge plate 84 of the hinge 80 is adjacent to and engaged with the inside surface 21 of the bottom panel 30 of the door 22 such that the bottom panel 30 of the door 22 is generally parallel to both the first and second hinge plates 82, 84 of the hinge 80.

As the door 22 is moved to the fully opened, horizontal position, the bottom roller wheel 37 moves upwardly within the vertical section 46 of the second guide track 42. The counterbalance mechanism 18 operates to wind the cable 100 around the drum 94 of the counterbalance mechanism 18 in order to pull the bottom panel 30 of the door 22 upwardly. As noted above, one end of the cable 100 is coupled to a bottom end of the bottom panel 30 via the bracket 106.

As shown in FIGS. 2 and 3, the cable 100 operates to pull the bottom end of the bottom panel 30 to a position adjacent the counterbalance header 98 thus positioning the bottom panel 30 of the door 22 in generally the same horizontal plane as the other adjacent panels 30 of the door 22. In particular, the bottom panel 30 of the door 22 is generally parallel to the horizontal section 48 of the first guide track 40 and is positioned above, or at least is generally aligned with, a bottom wall 108 of the counterbalance housing 98. Further, the bottom end 43 of the bottom door panel 30 is generally positioned adjacent and forward a vertical wall 110 of the counterbalance header 98. As such, when the door 22 is in the fully opened, horizontal position, the bottom end 43 of the bottom panel 30 of the door 22 does not hang or extend into the rear door opening 24 of the trailer 10.

Illustratively, as shown in FIGS. 2 and 3, the bottom roller wheel 37 of the door assembly 12 remains positioned within the second guide track 42 when the door 22 is in the opened, horizontal position. In this position, a bottom portion of the bottom panel 30 is spaced-apart from the bottom roller wheel 37. As such, when the door 22 is in the fully opened, horizontal position, the hinge 80 is in an angled position such that the first and second hinge plates 82, 84 of the hinge 80 are angled relative to each other and are not positioned to lie in the same plane. In particular, the first hinge plate 82 remains secured to the bottom door panel 30 and is positioned to lie in a generally horizontal plane parallel to the bottom door panel 30. However, the second hinge plate 84 remains secured to the mount portion 76 of the bottom door roller wheel 37 which is located in the curved section 54 of the second guide track 42. Thus, by coupling the bottom door roller wheel 37 to the bottom panel 30 of the door 22 via the hinge 80 and the roller bracket 72, the bottom door panel 30 is able to move away from the bottom door roller wheel 37 to an out-of-the-way horizontal position such that the bottom door panel 30 is not hanging down into the rear door opening 24 of the trailer 10.

Illustratively, as shown in FIGS. 2 and 3, when the door 22 is in the fully opened, horizontal position, the hinge 80 is in an angled position such that the first hinge plate 82 and the second hinge plate 84 are angled relative to each other. As noted above, the first hinge plate 84 is coupled directly to the inside surface 21 of the bottom door panel 30 for movement with the bottom door panel 30. Thus, the first hinge plate 84 remains parallel to the door panel 30 throughout operation of the door assembly 12, and particularly when the door 22 is in the fully opened, horizontal position. The second hinge plate 84, on the other hand, moves relative to the bottom door panel 30 as the bottom door panel 30 is pulled upwardly by the cable 100 of the counterbalance mechanism 18. In particular, the cable 100 of the counterbalance mechanism 18 is routed over the roller 112 and operates to pull the bottom end 43 of the bottom door panel 30 toward the counterbalance mechanism 18. During this movement, the bottom roller wheel 37 remains within the second guide track 42 due to the generally C-shaped configuration of the track 42 which prevents the bottom roller wheel 37 from being unintentionally removed from the track 42. Further, because the second hinge plate 82 is directly coupled to the roller bracket 72, the roller bracket 72 is directly coupled to the roller wheel 37, and because neither the second hinge plate 82 nor the roller bracket 72 are directly coupled to the door panel 30, the second hinge plate 82 and the roller bracket 72 are urged to move relative to the door panel 30 about the pivot axis 90 of the hinge 80. In other words, as the cable 100 of the counterbalance mechanism 18 operates to pull the bottom door panel 30 toward the counterbalance mechanism 18, the bottom portion of the door panel 30 moves away from the bottom roller wheel 37, the roller bracket 72, and the second hinge plate 84 as the bottom roller wheel 37 remains within the second guide track 42. Illustratively, the bottom roller wheel 37 remains within the curved portion 54 of the second guide track 42. However, depending on the size, configuration, and placement of the hinge 80 relative to the bottom door panel 30 and the bottom roller wheel 37, the bottom roller may remain within another portion of the second guide track 42 when the bottom portion of the panel 30 is urged to move away from the bottom roller wheel 37.

As such, when the door 22 is in the fully opened, horizontal position, the bottom roller wheel 37, roller bracket 72, and second hinge plate 84 are spaced-apart from the inside surface 21 of the bottom door panel 30. Illustratively, approximately a bottom half of the bottom door panel 30 is spaced-apart from the bottom roller wheel 37, roller bracket 72, and second hinge plate 84 when the door 22 is in the opened, horizontal position. Again, it should be understood that depending on the size, configuration, and placement of the hinge 80 relative to the bottom door panel 30 and the bottom roller wheel 37, any suitable portion of the bottom door panel 30 may be spaced-apart from the roller wheel 37 when the door 22 is in the fully opened, horizontal position.

As shown in FIGS. 2 and 3, the counterbalance header 98 creates a header space 114 generally forward of the header 98 into the interior of the trailer 10 and generally defined by the roof 20 of the trailer 10, the rear wall 110 of the header 98, and an imaginary plane aligned with the bottom wall 108 of the counterbalance header 98 and extending the length of the trailer 10. Illustratively, various roof bows 116, the first guide track 40, and at least a portion, if not all, of the horizontal section 50 of the second guide track 42 are generally located within the header space 114. Accordingly, none of the roof bows 116, the first guide track 40, and at least a portion of the horizontal section 50 of the second guide track 42 extend downwardly into the rear opening 24 of the trailer. As such, when the door 22 is in the opened, horizontal position, most, if not all, of the door 22 is also illustratively positioned within the header space 114 of the trailer 10 in an out-of-the way position that does not interfere with, or extend into, the rear opening 24 of the trailer 10.

The housing 98 is coupled to the roof 20 of the trailer 10 and extends downwardly from the roof 20 approximately three and a half inches. When the door 22 is in the fully opened position, the door 22 is generally positioned between the header 98 and a forward-most portion of the trailer 10. Further illustratively, the bottom edge 43 of the bottom door panel 30 is positioned forwardly of the forward vertical wall 110 of the counterbalance housing 98. Similarly, the horizontal sections 48, 50 of the guide tracks 40, 42 are located between the header 98 and the forward-most portion of the trailer 10 to support the door 22 on the rollers 36, 37 thereon. As such, all panels 30 of the door 22 are positioned adjacent the horizontal sections 48, 50 of the guide tracks 40, 42 when the door 22 is in the fully opened position. Generally, no portion of the door 22 is left to rest along or adjacent to the curved sections 52, 54 of the guide tracks 40, 42 to extend into the rear door opening 24. Accordingly, in the fully opened position, the door 22 does not extend into the rear door opening 24 to block or obstruct any portion of the rear door opening 24. The bottom roller assembly 70 allows the bottom door panel 30 to be spaced-apart from the bottom roller wheel 37 and the guide tracks 40, 42 allows the door 22 to be pulled fully to this horizontal position. Illustratively, the door opening 24 defines a height 99 of approximately 110 inches. Thus, when the door 22 is in the opened position, access to the entire, unobstructed 110 inches of the rear door opening 24 is possible.

Looking now to FIG. 3, the door assembly 10 further includes a latch mechanism 120 coupled to the bottom panel 30 of the door 22. Illustratively, the latch mechanism 120 is positioned generally centrally on the door panel 30 between the side edges 34 of the door panel 30. The latch 120 is not shown in FIG. 2 only for purposes of clarity. Illustratively, the latch mechanism 120 may be a typical latch mechanism commonly understood by one skilled in the art to lock or latch the door 22 with the bottom threshold of the trailer 10 when the door 22 is in the closed, vertical position. In other words, the latch mechanism 120 is moved to a locked position to couple with a corresponding structure in the bottom threshold of the trailer 10 in order to maintain the door in the fully closed position on the trailer 10. As illustrated in FIG. 3, the latch mechanism 120 is positioned within the header space 114 when the door 22 is in the fully opened, vertical position.

Also shown in FIG. 3 (but not illustrated in FIG. 2 for purposes of clarity) is a pull-strap 130 provided to help a user close the door 22, or move the door 22 to the closed, vertical position. The illustrative pull strap shown in FIG. 3 is coupled to the bottom edge 43 of the bottom panel 30 of the door 22 and hangs downwardly when the door 22 is in the fully opened, horizontal position. Illustratively, the pull strap 130 may be located at either the right or left sides of the door panel 30 in an out-of-the-way position. The user is able to grab the pull strap 130 and pull downwardly on the strap 130 to overcome the force of the counterbalance mechanism 18 holding the bottom door panel 30 in the horizontal position in order to move the door 22 to the fully closed, vertical position. While the illustrative pull-strap 130 is shown in FIG. 3, it should be understood that other suitable pull-straps, handles, etc. may be used to allow a user to move the door 22 from the opened, horizontal position toward to the closed, vertical position. For example, an alternative pull-strap mechanism is shown and described in U.S. Utility Application Ser. No. 13/113,144 entitled OVERHEAD DOOR ASSEMBLY FOR A STORAGE CONTAINER, the entirety of which is incorporated by reference herein. As noted above, when the door 22 is in the horizontal, opened position, generally no portion of the door 22 is positioned in the curved sections 52, 54 of the tracks 40, 42 such that generally no portion of the door 22 is left to hang downwardly into the rear door opening 24. Thus, in order to move the door 22 from this horizontal, opened position to the vertical, closed position, an operator grabs the portion of the pull-strap 130 positioned below the door 22 and pulls downwardly on the pull-strap 130.

As the door 22 is moved from the opened position back to the closed position, the torsion spring of the counterbalance mechanism 18 is stretched to provide a force which counteracts the weight of the door 22. As such, the torsion spring controls the descent of the door 22 as the door 22 moves toward the closed position. As the door 22 moves toward the closed position, the top end roller 39 remains within the outer guide track 40 while the offset rollers 36 remain within the inner guide track 42.

Accordingly, because the door 22 is maintained in the header space 114 between the housing 98 and the front of the trailer 10, the bottom edge 43 of the door 22 is protected or blocked by the housing 98 in order to prevent this edge 43 of the door 22 from being hit or bumped by freight during an unloading process, for example. In other words, the counterbalance housing 98 operates to protect the upper edge 43 of the door 22 when the door 22 is in the opened position. As such, hingedly-mounted bottom roller wheel 37 allows the bottom panel 30 of the door 22 to be located in a protected and out-of-the-way position when the door 22 is in the fully opened position such that persons, freight, or vehicles, such as forklifts, which are used to carry freight into and out of the trailer 10 do not accidentally bump the bottom edge 43 of the door 22, thus potentially causing the door 22 to unintentionally move toward the closed position onto any persons or freight which may be positioned in the rear door opening 24.

Figure 6:
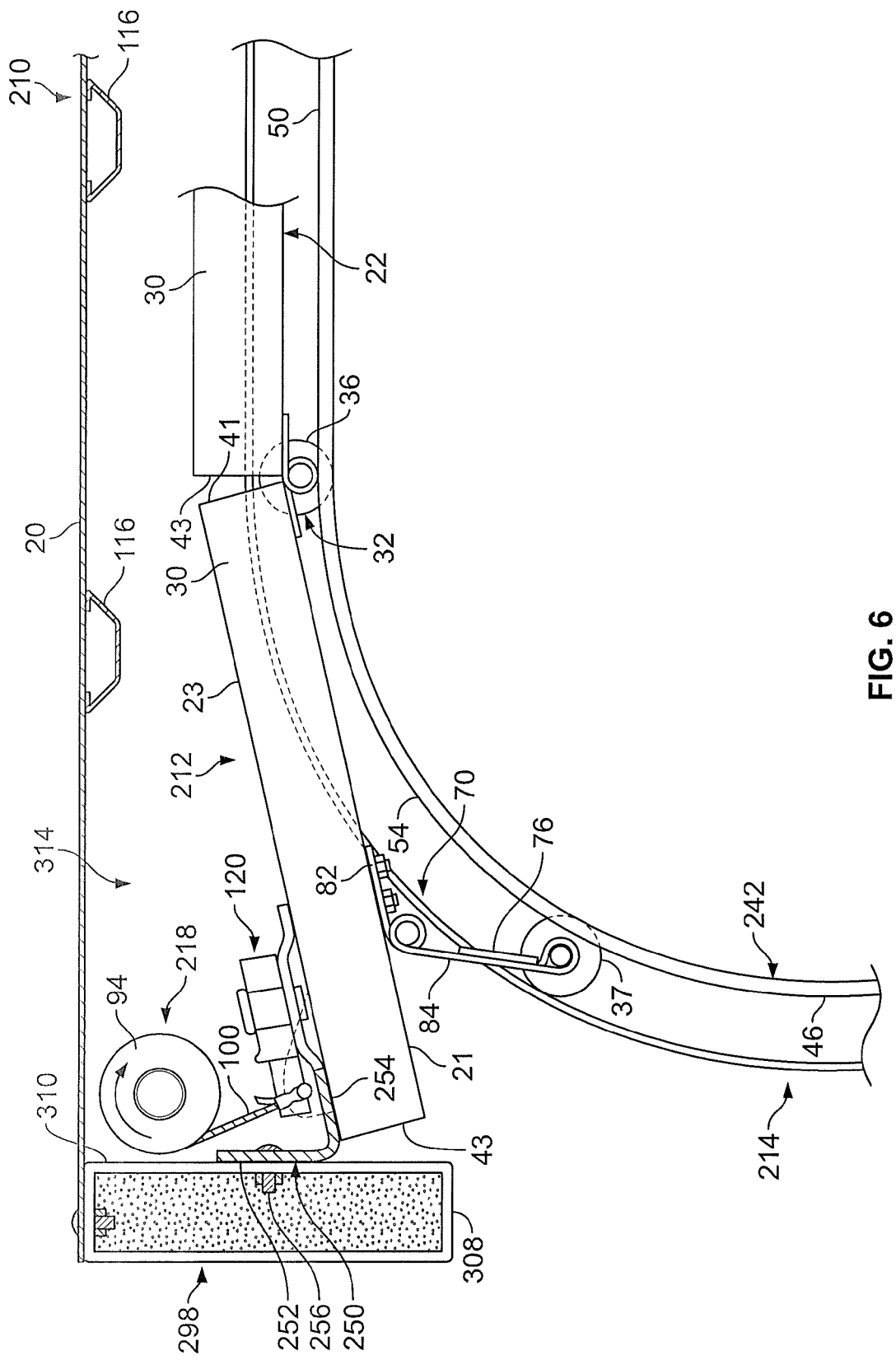
FIG. 6 is a side view of a portion of an alternative overhead door assembly showing a stop mechanism to prevent the door from engaging a counterbalance mechanism of the door assembly.

While the particular, trailer 10 including the guide track systems 14 is disclosed herein, it should be understood that an overhead door, such as the door 22, may be used with any suitable trailer 10 having any suitable guide track system which operates to guide the roller assemblies 36 coupled to the door 22 between opened and closed positions. For example FIG. 6 illustrates an alternative overhead door assembly 212 coupled to an alternative trailer 210. Illustratively, the trailer 210 is a dry freight trailer and includes a header 298 coupled to and depending downwardly from the roof 20 of the trailer 210. An alternative counterbalance mechanism 218 is coupled to the roof 20 and/or sidewalls 16 of the trailer 210 and is positioned forward of the header 298. Illustratively, the counterbalance mechanism 218 of FIG. 6 is similar to the counterbalance mechanism 18 of FIGS. 2-4; as such, like reference numerals are used to denote the same or similar components. However, the torsion spring (not shown) of the counterbalance mechanism 218 of FIG. 6 operates by winding in a clockwise manner when moving the door 22 to the opened, horizontal position shown in FIG. 6. In other words, the cable 100 is wound around the drum 94 in a clockwise direction as the door 22 is moved to the opened position.

Further illustratively, the trailer 210 includes an alternative guide track system 214 including a single guide track 242 coupled to each sidewall 16 of the trailer 210. In other words, the guide track system 214 of the trailer 210 does not include two separate guide tracks, but simply includes the one guide track 242. Illustratively, the single guide track 242 is the same as or similar to the second guide track 42 of the guide track assembly 14 discussed above and shown in FIGS. 2-4. As such, like reference numerals are used to denote the same or similar components. In particular, the guide track 242 includes the vertical section 46, the curved section 54, and the horizontal section 50. Illustratively, most, if not all, of the horizontal section 50 of the guide track 242 is positioned within a header space 314 defined between a rear wall 310 of the header 298, the roof 20, a forward-most wall (not shown) of the trailer 10, and an imaginary plane aligned with the bottom wall 308 of the header 298 and extending the length of the trailer 10. As is discussed in detail above in regard to the door assembly 12 of FIGS. 2-4, the door panels 30 of the door 22 are positioned generally entirely within the header space 314 when the door 22 is in the opened, horizontal position shown in FIG. 6.

Illustratively, as discussed above, the counterbalance mechanism 218 of the trailer 210 is not enclosed within a protective counterbalance housing. As such, a stop mechanism 250 is coupled to the rear wall 310 of the header 298 in order to prevent the bottom panel 30 of the door 22 from engaging the counterbalance mechanism 218 when the door 22 is moved to the opened position. Illustratively, though only one stop mechanisms 250 is shown in FIG. 6, it should be understood that any number of stop mechanism 250 may be coupled to the header 298 in order to prevent the bottom door panel 30 from engaging the counterbalance mechanism 298. For example, two stop mechanisms 250 may be coupled to the header 298 and positioned such that each of the two stop mechanisms 250 is located on either side of the latch mechanism 120 of the door 22 when the door 22 is in the fully opened position.

As shown in FIG. 6, the stop mechanism 250 is generally L-shaped and includes a vertical plate 252 and a horizontal plate 254 coupled to the vertical plate 252. Illustratively, the vertical plate 252 is coupled to the inner wall 310 of the header 298 using a rivet 256; however, it should be understood that any suitable fastener, such as a nail, screw, bolt, or weld, for example, may be used as well. When the stop mechanism 250 is coupled to the header 298, the horizontal plate 254 extends forwardly into the header space 314 of the trailer 210. Further illustratively, the stop mechanism 250 is positioned generally below the counterbalance mechanism 218, as shown in FIG. 6.

In use, when the drums 94 of the counterbalance mechanism 218 rotate in a clockwise direction to wind the cable 100 there-around and raise the door 22 to the opened position, the stop mechanisms 250 operate to prevent upward movement of the door 22 beyond a certain predetermined location. In particular, the outside surface 23 of the bottom panel 30 of the door 22 engages the horizontal plate 254 of each stop mechanism 250 as the door 22 is moved to the opened position in order to prevent the bottom panel 30 of the door 22, and the latch mechanism 120 coupled to the bottom panel 30, from engaging the counterbalance mechanism 218. In other words, the stop mechanism 250 operates against the winding torque of the spring of the counterbalance mechanism 218 in order to stop further upward movement of the bottom panel 30 of the door 22 toward the counterbalance mechanism 218.

It should be understood that while the particular stop mechanism 250 is shown and disclosed herein, the overhead door assembly 212 may include any suitable stop mechanism configured to prevent upward movement of the door 22 beyond a certain predetermined position. Further, such a stop mechanism may be coupled to any other component within the trailer 210 in order to act on the door 22, the counterbalance mechanism 218, and/or the cable 100 of the counterbalance mechanism 218 in order to prevent the door 22 from engaging, and potentially harming, the counterbalance mechanism 218. In other words, one or more stop mechanisms may be coupled to the sidewalls 16, the roof 20, and/or the front wall (not shown) of the trailer 210 to engage the door 22 and/or the counterbalance mechanism 218 to prevent the door 22 from engaging the counterbalance mechanism 218. Further illustratively, the stop mechanism 250 may be padded or may include another dampening structure to lessen the impact of the bottom door panel 30 against the stop mechanism itself. Alternatively, the counterbalance mechanism 218 may be enclosed within a counterbalance housing (not shown). In such a configuration and with the cable 100 of the counterbalance mechanism 218 being wound in a clockwise direction, thus exiting from the lower, left quadrant of the drum 94, the housing would operate as the stop mechanism such that the bottom door panel 22 would engage the counterbalance housing when the door 22 is moved to the fully opened position.

Figure 7:
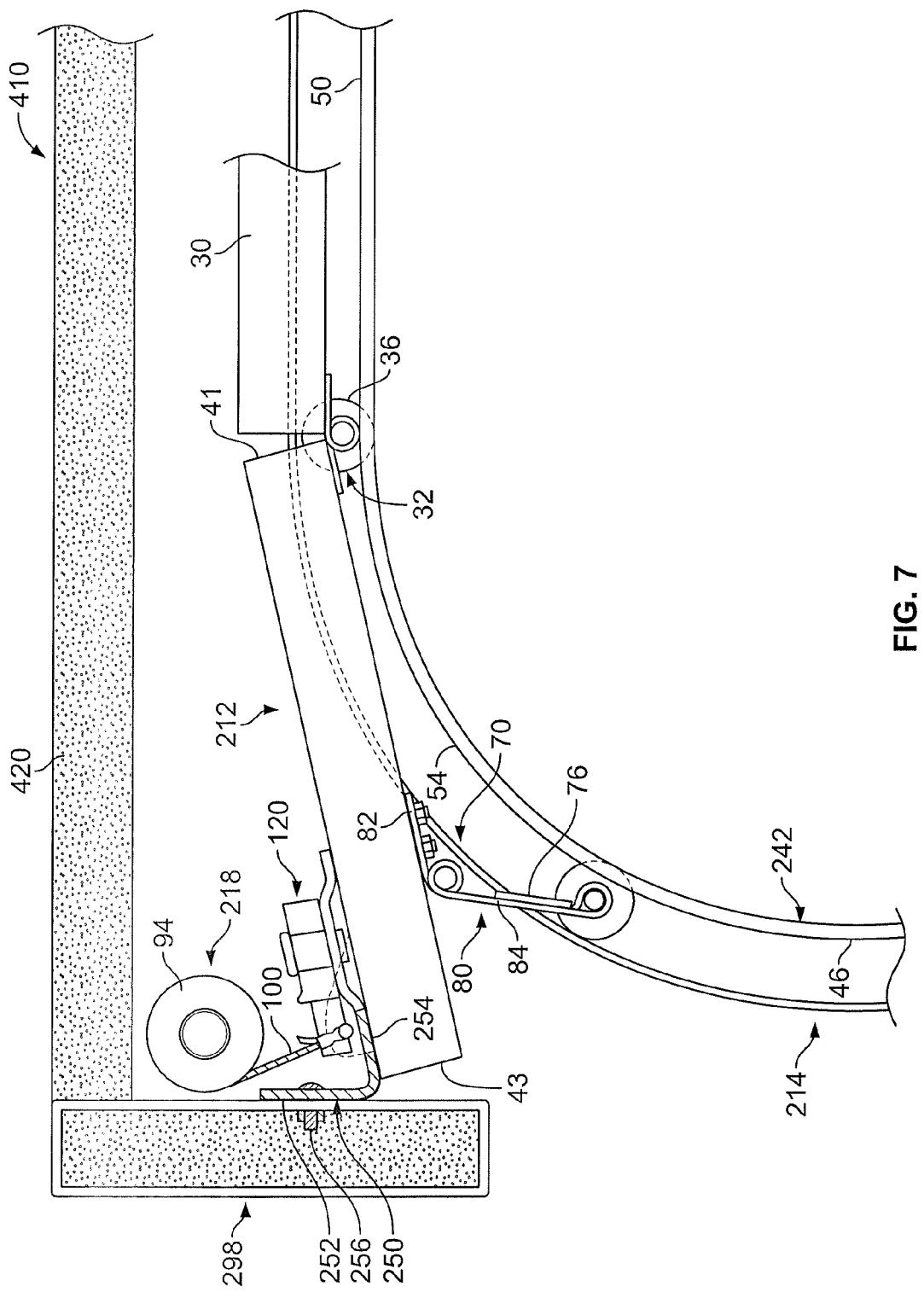
FIG. 7 is a side view of a portion of the overhead door assembly of FIG. 6 located within a refrigerated trailer.

The overhead door assembly 212 of FIG. 6 may also be used with a refrigerated trailer 410, as shown in FIG. 7. As such, the same or similar reference numerals are provided to denote the same or similar components. Illustratively, the refrigerated trailer 410 includes an insulated roof 420 extending horizontally away from the header 298 of the trailer 410. While the two door assemblies 12, 212 are shown and described herein as being used with the illustrative trailers 10, 210, and 410, it should be understood that the various door assemblies disclosed herein may be used with any suitable trailer having a rear opening.

Figure 13:
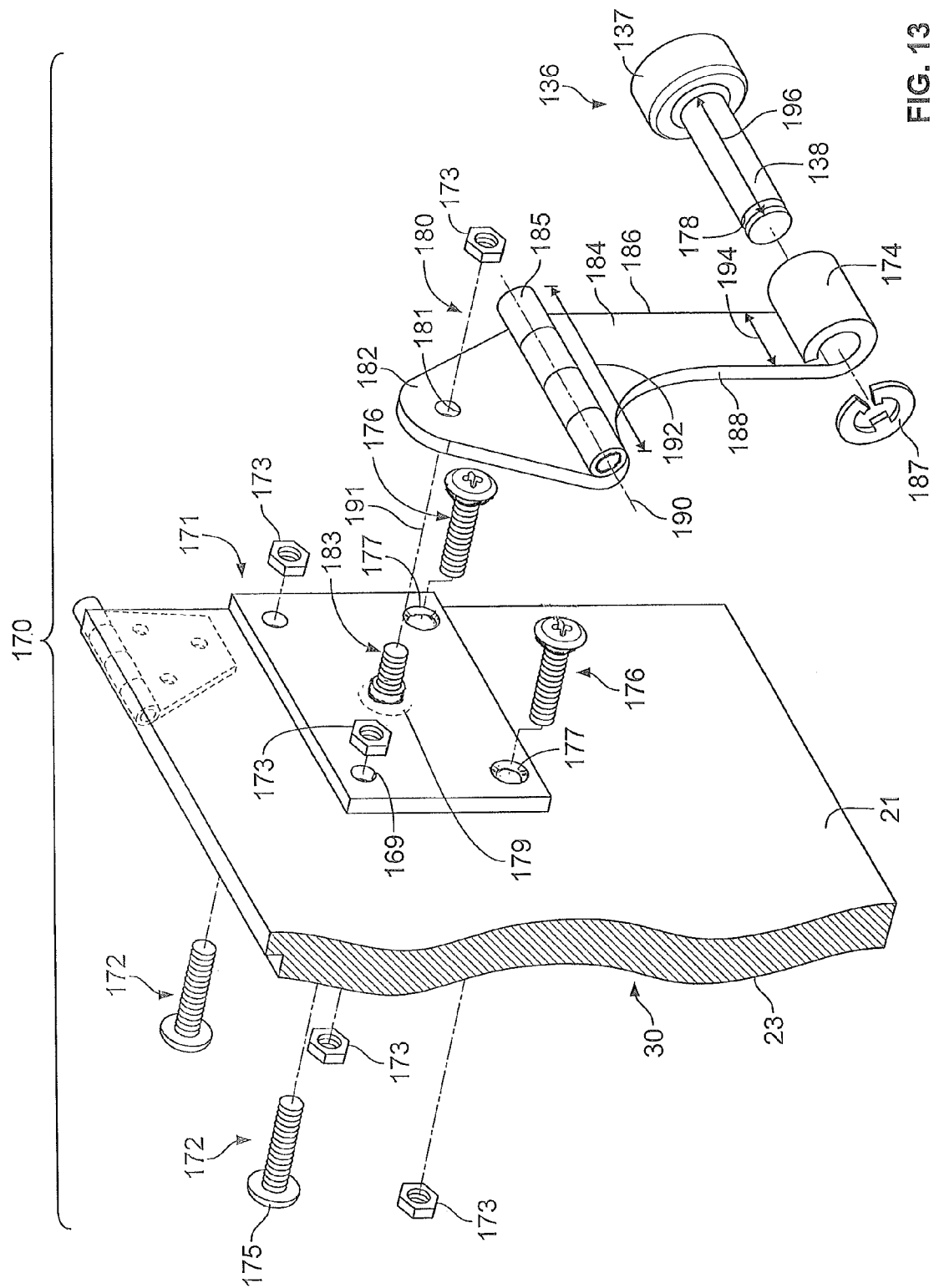
FIG. 13 is an exploded view of an alternative hinged bottom roller assembly.

Looking now to FIG. 13, an alternative bottom roller assembly 170 is provided. Similar to the roller assembly 70 described above and shown in FIGS. 2-7, the roller assembly 170 operates to allow the bottom panel 30 of the door 22 to move away from the track 14 to a generally horizontal position when the door 22 is in the fully opened position. As is described in greater detail below, however, the roller assembly 70 is configured to allow a roller wheel 137 of the assembly 170 to pivot about a first axis of rotation 190 relative to the door 22, as well as a second axis of rotation 191 relative to the door 22.

As shown in FIG. 13, the bottom roller assembly 170 includes a mounting bracket 171 coupled directly to the bottom panel 30 of the door 22. Illustratively, the mounting bracket 171 is square in shape; however, it should be understood that the mounting bracket 171 may be any suitable size or shape. The mounting bracket 171 is coupled to the door panel 30 through the use of two bolts 172 which are received through corresponding apertures 169 formed in the mounting bracket 171 and through the door panel 30 as well as the corresponding nuts 173 to secure the mounting bracket 171 to the bolts 173. Illustratively, the bolts 172 are received through the outside surface 23 of the door panel 30 such that a head 175 of the bolts 172 is adjacent the outside surface 23 of the door panel 30. Illustratively, two other fasteners 176 are received through two other apertures 177 formed through the mounting bracket 171 and the door panel 30. Illustratively, the fasteners 176 may each include flat heads (not shown) which may be countersunk within apertures 177 of the the mounting bracket 171 such that the fasteners 176 do not interfere with the movement of a hinge 180 of the bottom roller assembly 170 about an axis 191, as is described below. Nuts 173 are similarly used to secure the fasteners 176 and the mounting bracket 171 to the door panel 30. While the particular bolts 172 and fasteners 176 are shown herein and described above, it should be understood that any suitable fasteners, including screws, rivets, nails, and adhesives, may be used in order to rigidly couple the mounting bracket 171 to the inner surface 21 of the bottom door panel 30.

As shown in FIG. 13, the bottom roller assembly 170 further includes the hinge 180 that is pivotably coupled to the mounting bracket 171. Illustratively, the hinge 180 includes a first, or upper, hinge plate 182 configured to be pivotably coupled to the bottom panel 30 of the door 22 (via the mounting bracket 171), a second, or lower, hinge plate 184 that is not directly coupled to the bottom panel 30 of the door 22, and a hinge joint 185 formed between the first and second hinge plates 182, 184 and allows the hinge plates 182, 184 to pivot relative to each other. Illustratively, the hinge joint 185 defines the first axis of rotation 190 of the roller assembly 170. As is described in greater detail below, the second hinge plate 184 is configured to pivot about the second axis of rotation 191 relative to the door 22. Illustratively, the first axis of rotation 190 is parallel to a plane defined by the inner surface 21 of the bottom door panel 30.

The first hinge plate 182 is pivotally coupled to the mounting bracket 171, and is thus pivotally coupled to the door panel 30, via a bolt 183 received through an aperture 179 in the mounting bracket 171 and a corresponding aperture (not shown) in the door panel 30. The bolt 183 is received through a corresponding aperture 181 formed in the first hinge plate 182 and is secured to the first hinge plate 182 via a nut 173 thus defining the second axis of rotation 191. The bolt 183 may be a step bolt including a collar adjacent the inner surface 21 of the door panel 30 in order to prevent the hinge 180 from being tightened to tightly against the inner surface of the door 21 and freely rotating about the pivot axis 191. Illustratively, the second axis of rotation 191 is perpendicular to the plane defined by the inner surface 21 of the bottom door panel 30 and is also perpendicular to the first axis of rotation 190. As is discussed in greater detail below, the hinge 180 is pivotable relative to the door panel 30 about the second axis of rotation 191.

The roller assembly 170 further includes a roller 136 having a roller wheel 137 and a shaft 138 coupled to the roller wheel 137. The shaft 138 is received through a shaft-receiving portion 174 of the second plate 184, and a retainer clip 187 of the roller assembly 170 is provided to maintain the shaft 138 of the roller 136 within the shaft-receiving portion 174. Illustratively, the retainer clip 187 is received within a groove 178 formed in the distal end of the shaft 138, as shown in FIG. 13. Illustratively, the shaft 138 is free to move laterally within the shaft-receiving portion 174. This movement may be limited as desired by positioning one or more washers (not shown) on the distal end of the shaft 138 between the clip 187 and the shaft-receiving portion 174.

As shown in FIG. 13, the second hinge plate 184 includes a generally straight outer edge 186 and a generally curved inner edge 188. As such, a top end of the second hinge plate 184 which forms the joint 185 defines a first width 192 generally equal to a width of the joint 185 itself. A bottom end of the second hinge plate 184, however, defines a second width 194 smaller than the first width 192. Illustratively, the first width 192 is approximately 3.0 inches while the second width 194 is approximately 1.0 inch. However, it should be understood that the second hinge plate 184 may be configured to define other suitable first and second widths as well. Further, a length 196 of the shaft 138 of the roller 136 is generally shorter than the first width 192 as well. Illustratively, the length 196 of the shaft 138 is approximately 1.25 inches.

In use, as noted above, the mounting bracket 171 is rigidly coupled to the inner surface 21 of the bottom panel 30 of the door 22. The hinge 180 is then pivotably coupled to the mounting bracket 171 in order to allow the roller assembly 170 to pivot about the second axis of rotation 191 relative to the door panel 30. However, it should be understood that the hinge 180 may be coupled directly to the inner surface 21 of the door panel 30 without the use of the mounting bracket 171. The second hinge plate 184 is able to pivot about the first axis of rotation 190 relative to the first plate 182 and relative to the door 22. Thus, the roller 136 is able to pivot about the first and second axes of rotation 190, 191 relative to the door panel 30. Further, the roller 136 is able to move laterally within the shaft-receiving portion 174 relative to the second hinge plate 184.

The shortened shaft 138 of the roller 136 allows the roller 136 to be located in an out-of-the-way position when the door 22 is in the fully opened position. As noted above, in regard to the roller assembly 70, the roller assembly 170 similarly operates to allow the bottom panel 30 of the door 22 to move away from the second hinge plate 184 when the door 22 is in the fully opened, horizontal position, as shown in FIG. 2, for example. In this position, the bottom panel 30 of the door 22 and the second hinge plate 184, including the roller 136, are spaced-apart from each other. In particular, the roller 136 is spaced apart from the door panel 22 in a direction perpendicular to the inner surface 21 of the door panel 30 and in a direction parallel to the inner surface 21 of the door panel 30, as shown in FIG. 2.

When the door 22 is in the fully opened position, the roller 136 remains within the track 14 while allowing the counterbalance mechanism 18 to pull the bottom panel 30 of the door 22 away from the roller 136. Thus, the roller 136 remains below, though not directly, the header 98 which houses the counterbalance mechanism 18. It is possible that a shaft (not shown) having a length greater than or equal to the length 192 of the hinge joint 185 may protrude from the track 14 into the opening 24 of the trailer 10. Accordingly, the shortened length 196 of the shaft 138 allows the shaft 138 to remain in an out-of-the-way position such that the shaft 38 does not protrude into the rear opening 24 of the trailer 10 when the door 22 is in the fully opened position. The ability of the roller 136 to pivot about the second axis of rotation 191 relative to the door 22 allows the roller 136 to move generally laterally back and forth in order to maintain the roller 136 within the guide track 14 during movement of the door 22 between the opened and closed positions. In other words, in the event that the guide tracks 14 of the door assembly 12 are not in exact alignment with each other, the roller 136, having the shortened shaft 138, is able to move back and forth relative to the door panel 30 in order to maintain the roller within the guide track 14 during operation of the door assembly 12.

Illustratively, while the length 192 of the hinge joint 185 of the roller assembly 170 is greater than the width 194 of the distal end of the lower hinge plate 184 and the length 196 of the shaft 138, it is within the scope of this disclosure to include a narrow hinge assembly for use with the roller 136 having the shortened shaft 138 whereby the greatest width of the upper hinge plate, the lower hinge plate, and/or the length of the hinge joint are substantially the same as the length of the shortened shaft 138 to provide a narrow hinge assembly.

Figure 14:
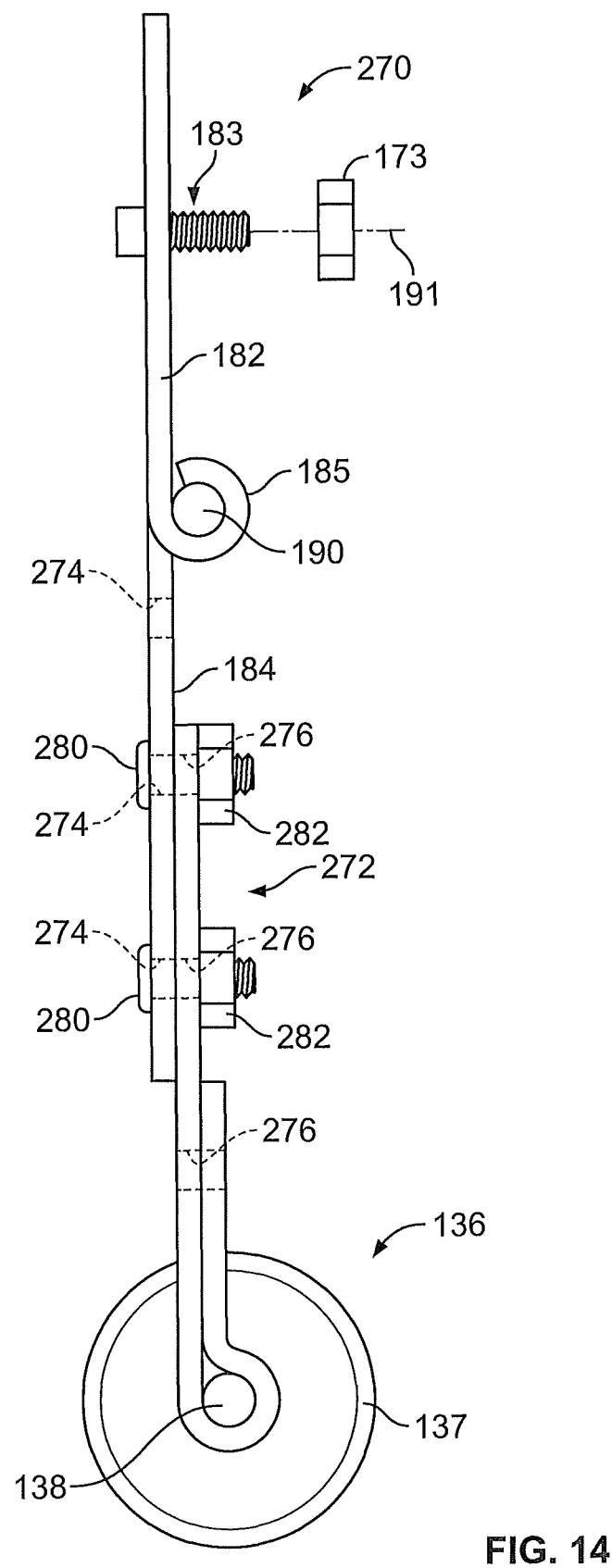
FIG. 14 is a side view of yet another alternative hinged bottom roller assembly.

Looking now to FIG. 14, another alternative bottom roller assembly 270 is provided. Illustratively, the roller assembly 270 is similar to the roller assembly 170 shown in FIG. 13 and described above. As such, the same reference numerals are used to denote the same or similar components. The roller assembly 270 shown in FIG. 14 further includes a roller bracket 272 which may be coupled to the second hinge plate 184 in a plurality of positions in order to space the roller 136 a plurality of distances away from the joint 185 and second pivot axis of rotation 191 of the hinge 180. Illustratively, the second hinge plate 184 includes three apertures 274 formed therein. The roller bracket 272 also includes three apertures 276 formed therein. Thus, the roller bracket 272 may be coupled to the second hinge plate 184 in a plurality of locations such that the upper aperture 276 of the roller bracket 272 may be aligned with the upper, middle, or lower apertures 274 of the second hinge plate 184. Bolts 280 and nuts 282 are received through the aligned apertures 274, 276 of the second hinge plate 184 and the roller bracket 272 in order to rigidly couple the roller bracket 272 to the second hinge plate 184. In the illustrative embodiment shown in FIG. 14, the roller 136 may be placed in three different locations and spaced three different distances away from the hinge joint 185 of the hinge 180. It is within the scope of this disclosure, however, to provide the second hinge plate 184 and/or the roller bracket 172 with additional apertures 274, 276 in order to provide additional locations for the roller bracket 172 on the second hinge plate 184. Illustratively, allowing the roller 136 to be spaced a variety of distances away from the hinge joint 185 allows the user to adjust the distance between the hinge joint 185 and the roller 136 in order to adjust and optimize the fit between the bottom door panel 30, the guide track system 14, and the roller assembly 270. Further, the adjustable distance between the hinge joint 185 and the roller 136 allows a user to install right and left bottom hinge assemblies on a bottom door panel 30 having different distances between the respective joint and the corresponding roller 136.

Figure 15:
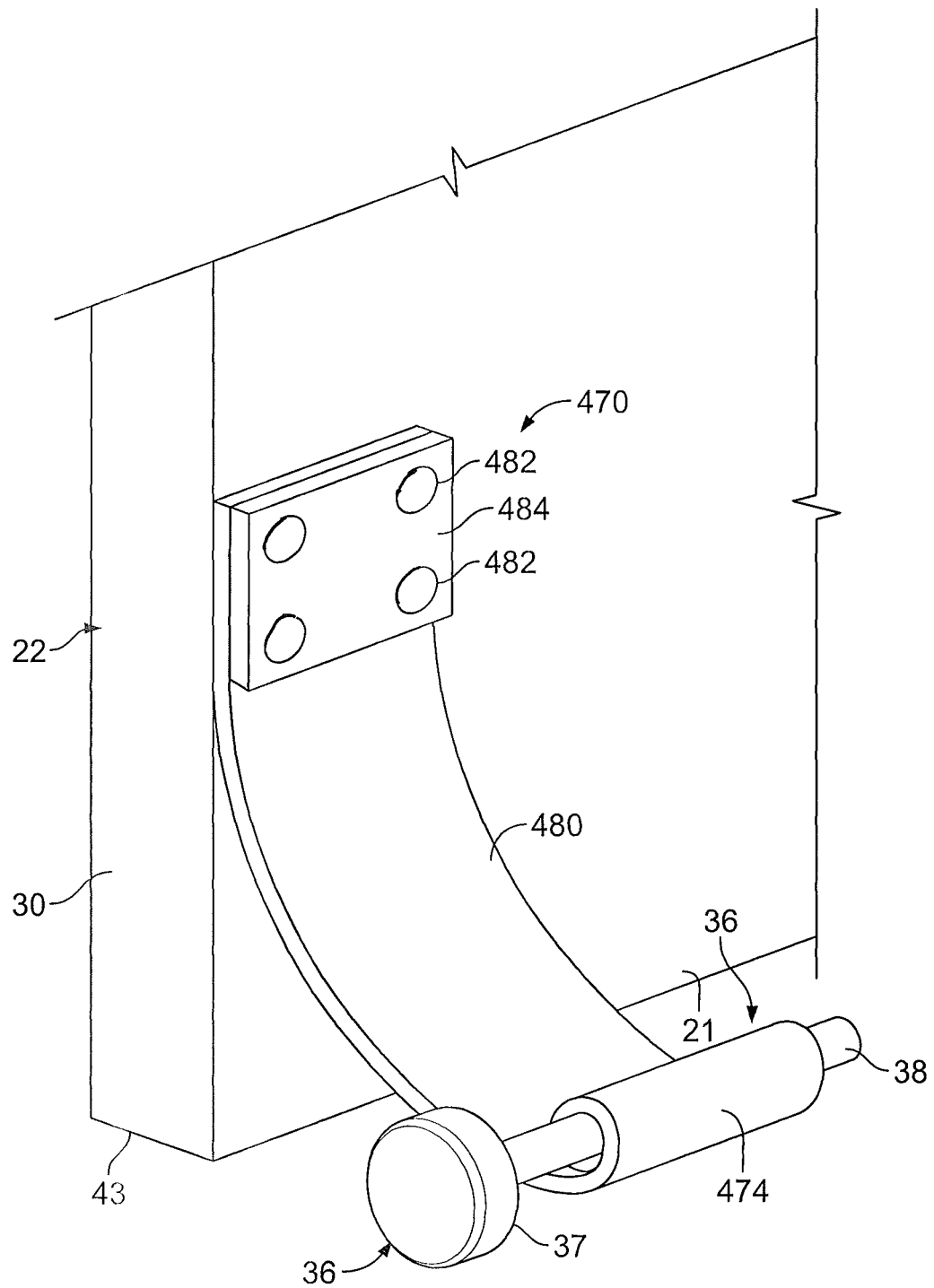
FIG. 15 is a perspective view of yet another alternative hinged bottom roller assembly of the present disclosure showing a flexible panel forming a living hinge.

Looking now to FIG. 15, still another alternative bottom roller assembly 470 is provided. As shown in FIG. 15, the bottom roller assembly 470 includes a flexible panel 480 coupled to the bottom door panel 30 via fasteners 482. A mounting plate 484 may be used as well. The roller 36, or alternative roller 136, is coupled to a distal end of the flexible panel 480 and is received within a shaft-receiving portion 474 of the flexible panel 480. A retainer clip (not shown) may be used to maintain the roller 36 within the shaft-receiving portion 474. Illustratively, and similar to the operation of the bottom roller assemblies disclosed above, the bottom roller assembly 470 operates to allow the roller 36 to be positioned adjacent the inner surface 21 of the bottom door panel 30 when the door 22 is in the fully closed position and allows the roller 36 to be spaced-apart from the bottom door panel 30 when the door 22 is in the fully opened position. In use, the flexible panel 480 is also configured to be positioned adjacent to the inner surface 21 of the door panel 30 when the door 22 is in the fully closed position and allows the door to move to the fully opened position within the header space 114 of the trailer 10 while maintaining the roller 36 within the guide track 14. Illustratively, the flexible panel 480 may be made of any suitable flexible material, including but not limited to metals, polymers, composites, etc.

It should be understood that while the bottom roller assemblies 70, 170, 270 are disclosed herein to include a hinge having a knuckle or butt hinge joint, it is within the scope of this disclosure to include a bottom roller assembly having a hinge including any suitable hinge joint, including a living hinge joint, for example, which defines a horizontally extending pivot axis. As noted in FIG. 15, it is further within the scope of this disclosure to include a flexible panel 480 which does not define a particular pivot axis, but which allows the bottom door panel 30 to move to a generally horizontal position away from the roller 36, 136 when the door 22 is in the fully opened position while the roller 36, 136 remains within the guide track 14.

Figure 8:
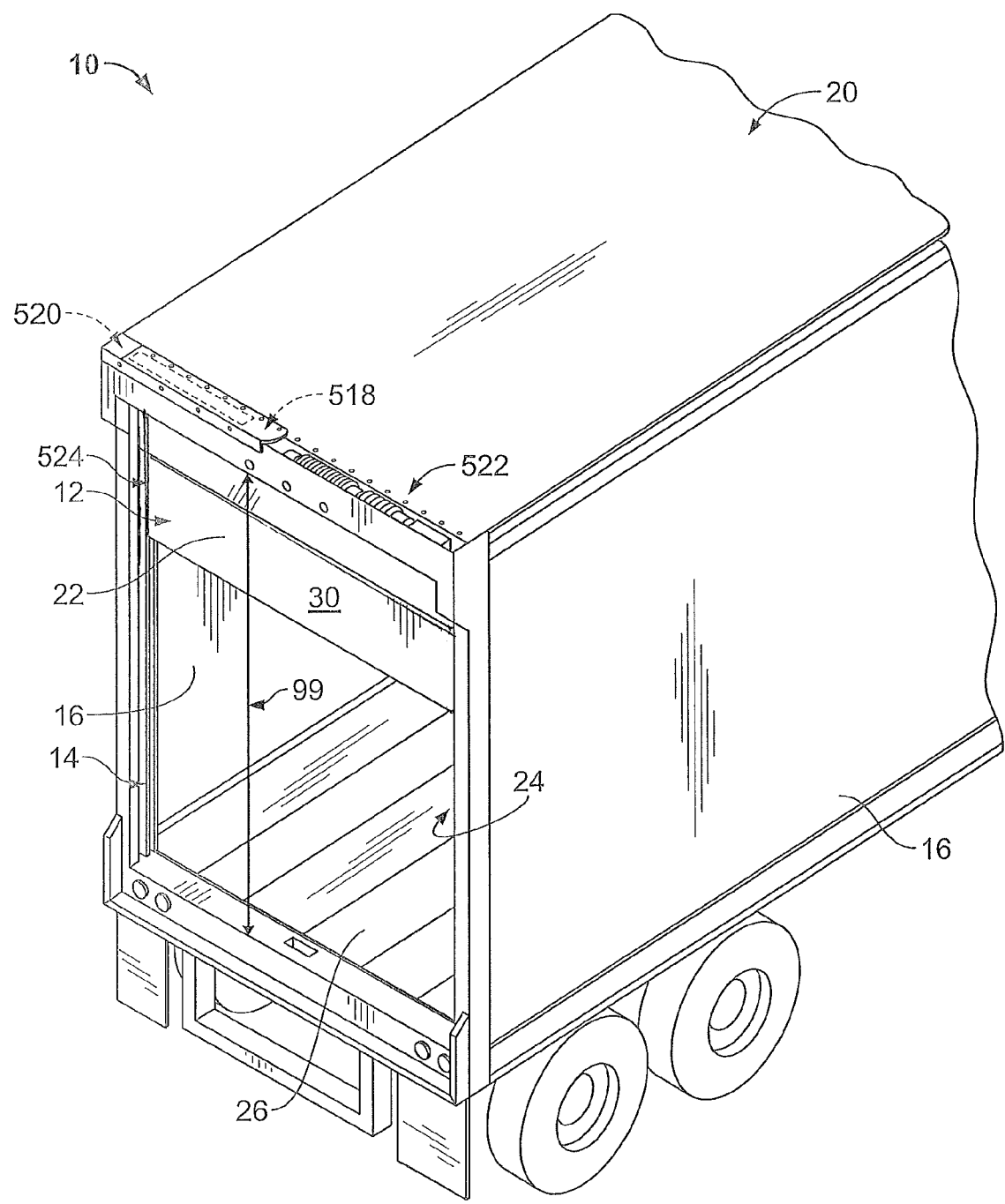
FIG. 8 is a rear, perspective view of a portion of a truck trailer with portions removed including an overhead door assembly having another embodiment of a counterbalance mechanism and showing a door of the assembly in a partially-opened position.

In another embodiment shown in FIGS. 8-10, a counterbalance assembly 518 includes two independent counterbalance mechanisms 520 and 522. The counterbalance assembly 518 counterbalances the door 30 in a manner similar to the counterbalance mechanisms 18 and 218. Utilizing the separate counterbalance mechanisms 520 and 522 allows for simple adjustment of the counterbalance forces necessary to support the door 30, as will be described in more detail below.

Figure 9A:
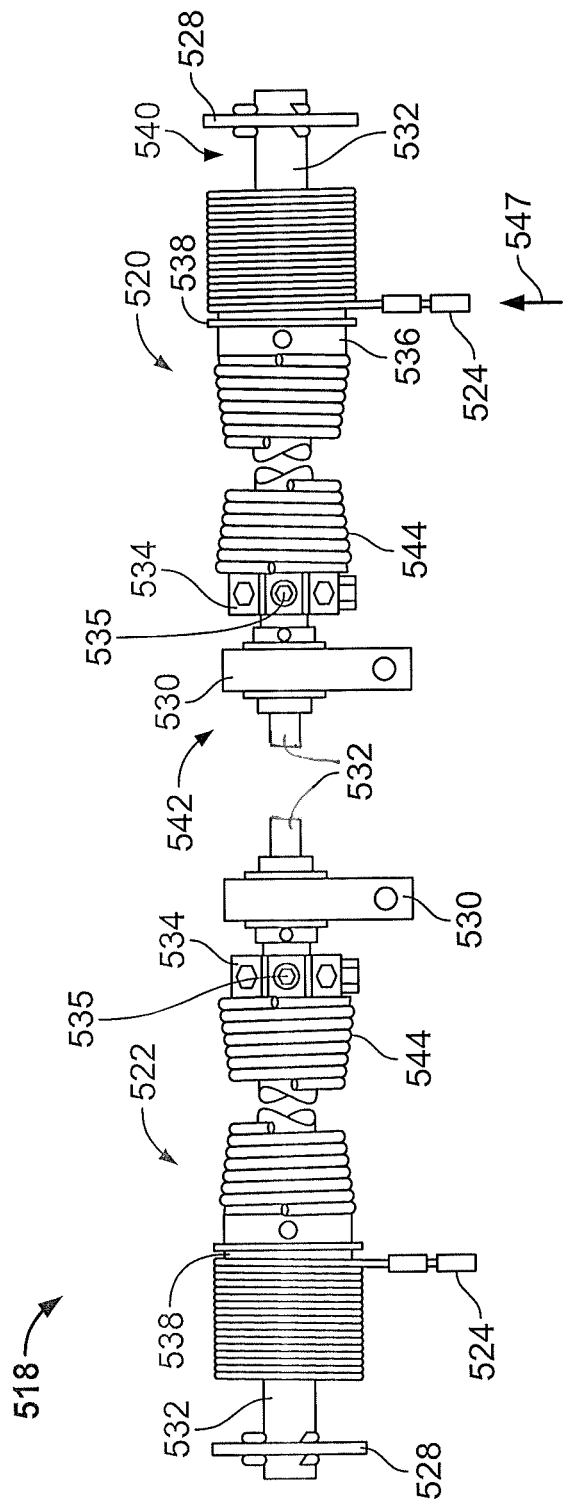
FIG. 9A is a bottom view of the counterbalance mechanism of FIG. 8.

The counterbalance assembly 518 is installed with the header 98 as shown in FIG. 8. Referring now to FIG. 9A, viewing the counterbalance assembly 518 from below and facing out the trailer 10, the counterbalance mechanism 520 is positioned on the right and the counterbalance mechanism 522 is positioned on the left. Illustratively, the counterbalance mechanism 522 is the same as the counterbalance mechanism 520; as such, only the counterbalance mechanism 520 is described herein. The door 30 is supported by two steel cables 524. The counterbalance mechanism 520 is supported by a bracket 528 at one end 540 and on an adjustment mechanism 530 on the opposite end 542. The adjustment mechanism is anchored to the frame, or roof assembly 22, of the trailer 10 and supports the end 542 of a shaft 532 of the counterbalance mechanism 520 thereon. The counterbalance mechanism 520 includes the stationary shaft 532 supported by the adjustment mechanism 530, a stationary cone 534, or spline, coupled to the adjustment mechanism 530 via the shaft 532, and a cable drum 538 having a winding cone 536 thereon. Illustratively, the stationary cone 534 is integral with the winding cone 536 of the cable drum 538. The cable drum 538 and winding cone 536 rotate relative to the shaft 532. Thus, as the cable 524 is extended, a torsion spring 544 is deflected and develops a counterbalance force 547 which assists in supporting the door 30.

Figure 10A:
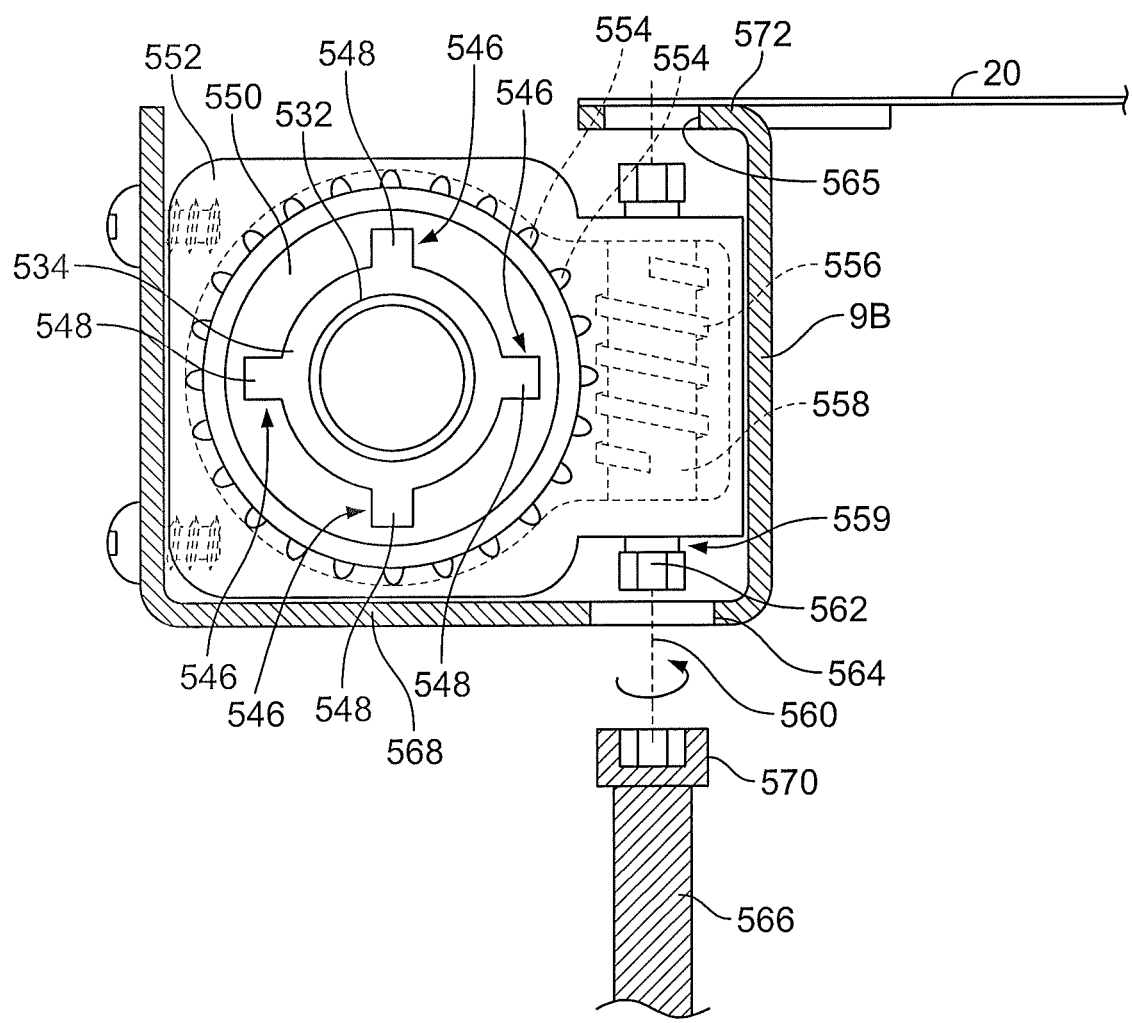
FIG. 10A is a side view of an adjustor assembly of the counterbalance mechanism of FIG. 9A.

The adjustment mechanism 530 is supported in the header 98 as shown in FIG. 10A. The adjustment mechanism 530 includes keyways 546 which receive keys 548 formed on the stationary cone 534. The keyways 546 are formed in a pinion 550 that is supported for rotation in an adjustor body 552 including a main body portion 551 and end plates 553 coupled to the adjustor body 552 via fasteners 555 (shown in FIG. 10B). The pinion 550 includes helical teeth 554 on an outer periphery which engage teeth 556 of a worm gear 558 supported on the adjustor body 552. Rotation of the worm gear 558 about an axis 560 causes the teeth 556 to act on the teeth 554 to rotate the pinion 550 about the shaft 532. Illustratively, the shaft 532 is stationary and does not rotate. Rotation of the pinion 550 operates to rotate the stationary cone 534 which in turn tensions the spring 544.

Illustratively, the worm gear 558 includes a pin 559 along a longitudinal axis thereof. The pin 559 includes a hex-shaped head 562 that may be engaged by a driver, or worm gear adjustor 566, which may be inserted through an aperture 564 formed in a bottom, horizontal wall 568 of the header 98 to permit a user to rotate the worm gear 558. The pin 559 is received through apertures 557 in the main body portion 551 of the adjustor body 552 and is secured to the adjustor body 552 via a fastener, or pin 525, (as shown in relation to an alternative adjustment mechanism 630 in FIG. 10B) in order to secure the pinion 550 and the worm gear 558 within the adjustor body 552. The pin 525 is received within a groove 526 formed in one end of the pin 559 in order to prevent the pin 525 from being removed from the adjustor body 551 while allowing the pin 525 to rotate within the adjustor body 551. The pin 559 further includes a flat portion 527 (also shown in the embodiment of FIG. 10B) which, in use, is aligned with a flat portion 529 within the worm gear 558. Accordingly, rotation of the pin 559 operates to rotate the worm gear 558 therewith.

Illustratively, the adjustor 566 includes a head 570 able to receive the hex-shaped head 562 of the pin 559 in order to rotate the hex-shaped head 562. It is within the scope of this disclosure to include other adjustors having other suitably-shaped heads configured for engaging the head 562 of the pin 559 in order to rotate the pin 559 and the worm gear 558. In use, a user may then stand generally in the rear opening 24 of the trailer 10 and insert the adjustor 566 through the bottom wall 568 to engage the pin 559 and head 562 associated with the worm gear 558 in order to rotate the worm gear 558 as needed. Illustratively, while the adjuster 566 may be inserted through the aperture 564 in the bottom wall 568 of the header 98, the adjuster 566 may also be inserted through an aperture 565 formed in a top wall 572 of the header 98 in order to allow a user to adjust the worm gear 558 from a location above the trailer 10.

Rotation of the worm gear 558 allows a user to adjust the pre-load of the torsion spring 544 to adjust the counterbalance force 546. The static friction of the interaction between the worm gear 558 and pinion 550 is sufficient to resist the torsional force of the torsion spring 544 such that adjustment of the position of the pinion 550 relative to the body 552 is maintained by the frictional force. Thus, the adjustment mechanism 530 is self-locking in that an additional lock is not necessary to prevent the worm gear 558, pinion 550, and cone 534 from rotating backwards, or back driving. The counterbalance mechanism 522 is a mirror image to the counterbalance 520 and thus includes the same components and operates in a similar manner.

Figure 11:
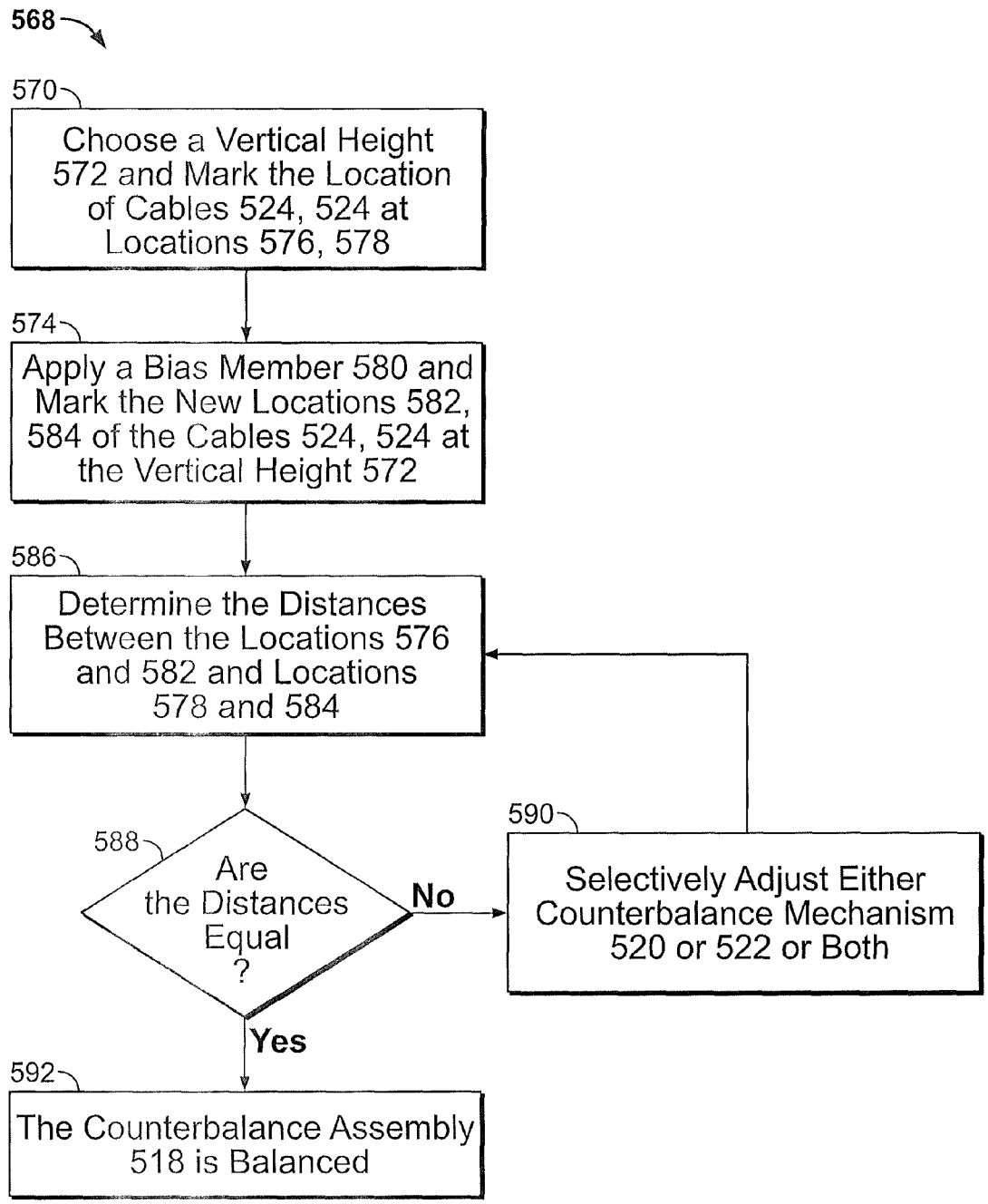
FIG. 11 is a flow chart of a process for balancing the counterbalance mechanism shown in FIG. 8.
Figure 12:
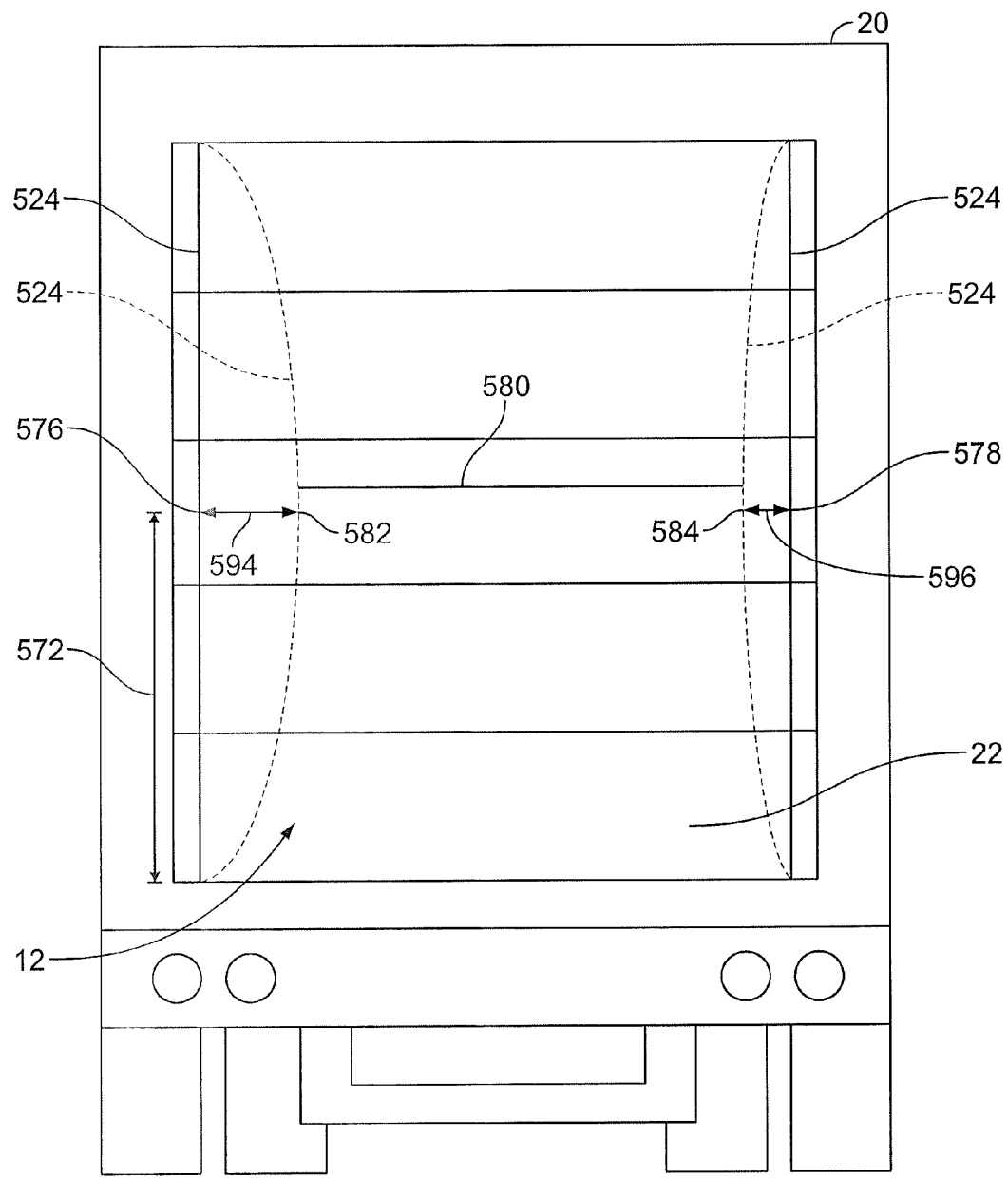
FIG. 12 is a schematic representation of the back of the trailer of FIG. 8 illustrating the process described in FIG. 11.

Because the counterbalance mechanisms 520 and 522 shown in FIG. 9A are independent and are independently adjustable, it is necessary to balance the counterbalance force in each of the counterbalance mechanisms 520 and 522 so that the door 30 rises evenly. A method 568 of adjusting the counterbalance assembly 518 is shown in the flowchart in FIG. 11. In a first step 570, a position of the door 30 at an illustrative vertical height 572 as shown in FIG. 12 is chosen. With the door 30 lowered, the position of each of the cables 524, 524 is marked at location 576 and 578 as shown in FIG. 12. At step 574, a user applies a bias member 580, such as a tarp strap, for example, to both cables 524, 524 at the vertical height 572 and marks new locations 582, 584 of the deflected cables 524, 524 (shown in phantom) with the bias member 580 applied. At step 586 of the method 568, the user measures the difference in the location each cable 524, 524 between the first locations 576, 578 and respective second locations 582, 584 to determine a respective deflection 594, 596 for each cable 524, 524. At step 588, the user determines if the deflections are equal. If they are, the balancing process is ended at step 592. If the distances are not equal, at step 590 the user selectively adjusts either the counterbalance mechanism 520 or counterbalance mechanism 522, or both and returns to step 588. This process is repeated until the deflection of the cables 524, 524 is equal, indicating that the counterbalance assembly 518 is balanced.

Figure 9B:
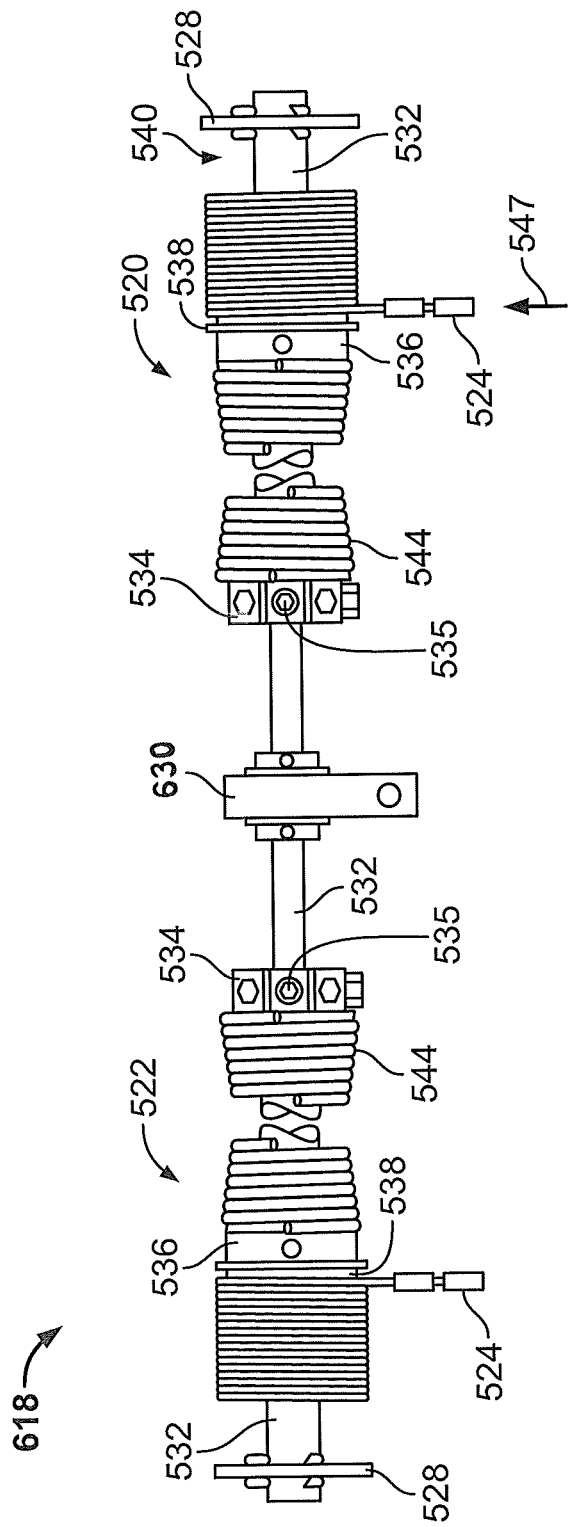
FIG. 9B is a bottom view of an alternative counterbalance mechanism similar to that shown in FIG. 9A but including a single, continuous shaft and only one adjustment mechanism.

Looking now to FIG. 9B, another alternative counterbalance assembly 618 is provided. The counterbalance assembly 618 is similar to the counterbalance assembly 518 shown in FIGS. 8 and 9A and described above. As such, the same reference numerals are used to denote the same or similar components. Unlike the counterbalance assembly 518, the counterbalance assembly 618 includes only one alternative adjustment mechanism 630 generally centrally located on a single shaft 532. Because the counterbalance assembly 618 includes only the single adjustment mechanism 630 which operates to preload both torsion springs 544 anchored to the single shaft 532, it is not necessary to separately balance the counterbalance force in each of the springs 544 because the single adjustment mechanism 630 generally operates to maintain balance between the two counterbalance forces in each of the springs 544 associated with each of the right and left drums 538.

Figure 10B:
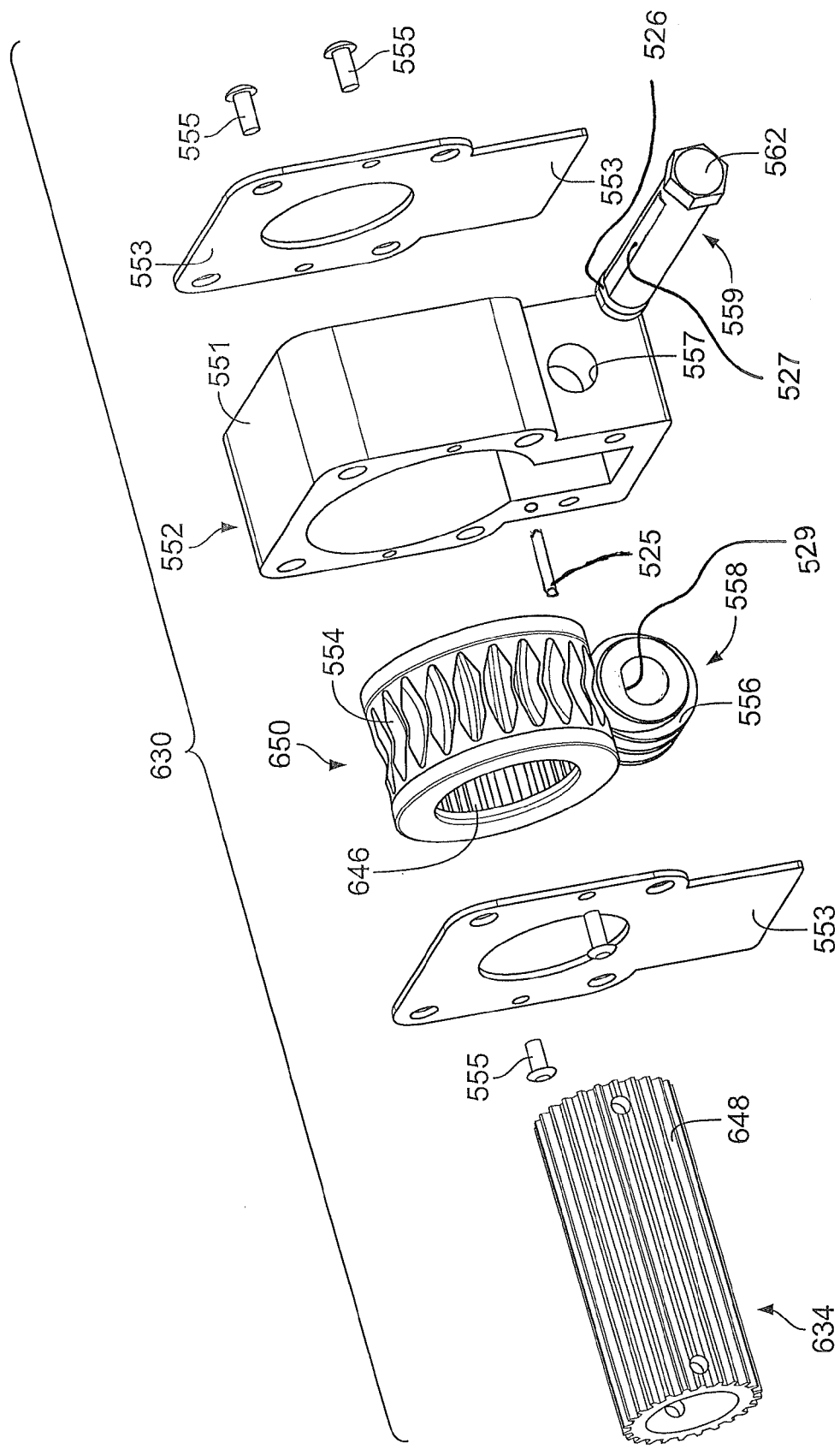
FIG. 10B is an exploded view of the adjustor assembly of the counterbalance mechanism shown in FIG. 9B.

Looking now to FIG. 10B, further detail of the alternative adjustment mechanism 630 is provided. Illustratively, the alternative adjustment mechanism 630 is similar to the adjustment mechanisms 530 discussed above. As such, the same reference numbers are used to denote the same or similar components. The adjustment mechanism 630 includes an alternative pinion 650 having a plurality of keyways 646 which receive alternative keys 648 formed on an alternative stationary cone, or spine body, 634. As shown in FIG. 10B, the pinion 650 includes many more keyways 646 which are much smaller than the four keyways 546 of the adjustment mechanism 530. Accordingly, the stationary cone 634 includes many more keys 648 than the four keys 548 of the stationary cone 534. It is within the scope of this disclosure to provide an adjustment mechanism and corresponding cone having any number of suitable keyways and keys in order to provide an interlocking connection between the two components. Illustratively, the finer threads, or keyways 646 and corresponding keys 648 provide a higher mechanical advantage and help to prevent the components from unintentionally rotating backwards, or back-driving. Accordingly, the adjustment mechanism 630 is self locking and does not require an additional lock to prevent the components from back-driving. However, one or more additional locks may be provided.

Illustratively, the spine body 634 is anchored to the shaft 532 via a pin (not shown) such that the shaft 532 and the spine body 634 rotate together. One or more set screws 535 are provided on each cone 534 in order to lock the cone 534 against the shaft 532 such that rotation of the shaft 532 operates to rotate each cone 534. Illustratively, such set screws 535 may be provided with the counterbalance mechanism 520, 522 shown in FIG. 9A as well. Rotation of the pin 529 by the worm gear adjustor 556 operates to rotate the worm gear 558. In turn, rotation of the worm gear 558 rotates the pinion 650 of the alternative adjustor 630. The pinion 650 then operates to rotate the spine body 634. As noted above, the shaft 532 is rotated with the spine body 634. Thus, the rotation of the shaft 532 operates to tension the spring 544 associated with each cable drum 538.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An overhead door assembly configured to be coupled to a storage container comprising:
    an overhead door including a plurality of door panels hingedly coupled to one another;
    a guide track system including a vertical section, a horizontal section, and a curved section; and
    a bottom roller assembly coupled to a bottom panel of the door, the bottom roller assembly including
        (i) a hinge having an upper hinge plate coupled to the bottom panel of the door, a lower hinge plate, and a hinge joint pivotably coupling the upper and lower hinge plates to each other for movement relative to each other about a pivot axis defined along the hinge joint, and
        (ii) a roller coupled to the lower hinge plate, the roller including a shaft and a roller wheel coupled to one end of the shaft,
    wherein the lower hinge plate and the roller thereon are configured to pivot about the pivot axis relative to the bottom panel of the door between a first position generally adjacent the bottom panel of the door and a second position spaced-apart from the bottom panel of the door,
    wherein the roller is located in the curved section of the guide track system when the lower hinge plate and the roller are in the second position.

2. The overhead door assembly of claim 1, wherein the lower hinge plate includes a first end coupled to the hinge joint and a second end coupled to the roller such that the shaft of the roller is spaced-apart from the hinge joint when the lower hinge plate is in the first position.

3. The overhead door assembly of claim 2, wherein the first end of the lower hinge plate defines a first length and the second end defines a second length smaller than the first length.

4. The overhead door assembly of claim 3, wherein a length of the shaft is smaller than the first length of the lower hinge plate.

5. The overhead door assembly of claim 1, wherein the shaft is configured to remain in an out-of-the-way position such that the shaft does not extend into a rear opening of the trailer when the door is in the opened position.

6. The overhead door assembly of claim 1, wherein the shaft is approximately 1.25 inches long.

7. The overhead door assembly of claim 1, wherein the upper hinge plate is pivotably coupled to the bottom panel of the door to allow the hinge to pivot relative to the bottom door panel about a second pivot axis perpendicular to the pivot axis defined by the hinge joint.

8. The overhead door assembly of claim 1, wherein a distance between the roller assembly and the joint of the hinge is adjustable.

9. The overhead door assembly of claim 1, wherein the door is movable between a closed position wherein the bottom panel of the door is in a generally vertical orientation, and an opened position wherein the bottom panel of the door is in a generally horizontal orientation, and further wherein the hinge is in the first position when the door is in the closed position and the hinge is in the second position when the door is in the opened position such that the lower hinge plate is spaced apart from the bottom door panel when the door is in the second position.

10. The overhead door assembly of claim 9, wherein the bottom door panel is configured to be positioned above a rear door opening of the trailer when the door is in the opened position.

11. The overhead door assembly of claim 1, wherein the roller is configured to lie adjacent the bottom panel of the door when the bottom panel of the door is in a vertical position, and wherein the roller is configured to lie spaced-apart from the bottom panel of the door when the bottom panel of the door is in a horizontal position.

12. The overhead door assembly of claim 11, wherein the roller is vertically-aligned with the joint when the lower hinge plate is in a first position and the upper and lower hinge plates are positioned to lie in the same plane, and wherein the roller is laterally spaced-apart from the joint and the upper and lower hinge plates are angled relative to each other when the lower hinge plate is in the second position angled relative to each other.

13. The overhead door assembly of claim 1, wherein the lower hinge plate and roller are unbiased between the first and second positions and the roller and lower hinge late pivot freely between the first and second positions.

14. The overhead door assembly of claim 1, wherein a bottom end of the bottom panel is spaced-apart from and positioned generally above the curved section of the guide track system when the lower hinge plate and the roller are in the second position.

15. An overhead door assembly configured to be coupled to a storage container comprising:
    an overhead door including a plurality of door panels hingedly coupled to one another; a hinge having an upper hinge plate coupled directly to a bottom panel of the door, a lower hinge plate, and a hinge joint pivotably coupling the upper and lower hinge plates to each other for movement relative to each other about a pivot axis defined along the hinge joint; and a bottom roller coupled to a distal end of the lower hinge plate for movement with the lower hinge plate about the joint, wherein the door is configured to move between a fully closed position wherein the bottom door panel is in a vertical orientation and the lower hinge plate and bottom roller are adjacent the bottom door panel, and a fully opened position wherein the bottom door panel is in a horizontal orientation and the lower hinge plate and bottom roller are spaced-apart from the bottom door panel.

16. The overhead door assembly of claim 15, wherein when the overhead door is in the fully opened position such that the bottom panel of the door is in the horizontal position, a bottom edge of the door is configured to lie forward of a rear header of the overhead door assembly.

17. The overhead door assembly of claim 15, further comprising a stop mechanism configured to prevent upward movement of the bottom panel of the door beyond a predetermined location.

18. The overhead door assembly of claim 17, wherein the stop mechanism is generally L-shaped and is configured to be coupled to a header of the storage container.

19. The overhead door assembly of claim 17, further comprising a counterbalance mechanism, wherein the stop mechanism is positioned below the counterbalance mechanism.

* * * * *